(12) United States Patent
Saito et al.

(10) Patent No.: US 11,650,063 B2
(45) Date of Patent: May 16, 2023

(54) INFORMATION PROCESSOR, INFORMATION PROCESSING METHOD, AND COMPUTER-READABLE RECORDING MEDIUM

(71) Applicant: SUBARU CORPORATION, Tokyo (JP)

(72) Inventors: Kazutaka Saito, Tokyo (JP); Toshiyuki Omura, Tokyo (JP); Atsushi Yasumuro, Tokyo (JP); Kazumasa Miura, Tokyo (JP); Masami Oishi, Tokyo (JP); Hideki Ogawa, Saitama (JP); Masanobu Tanaka, Saitama (JP)

(73) Assignee: SUBARU CORPORATION, Tokyo (JP)

( * ) Notice: Subject to any disclaimer, the term of this patent is extended or adjusted under 35 U.S.C. 154(b) by 92 days.

(21) Appl. No.: 16/903,031

(22) Filed: Jun. 16, 2020

(65) Prior Publication Data
US 2021/0063174 A1 Mar. 4, 2021

(30) Foreign Application Priority Data
Aug. 29, 2019 (JP) .............................. JP2019-157226

(51) Int. Cl.
*G01C 21/34* (2006.01)
*G01C 21/36* (2006.01)
(52) U.S. Cl.
CPC ..... *G01C 21/3446* (2013.01); *G01C 21/3461* (2013.01); *G01C 21/3492* (2013.01); *G01C 21/3697* (2013.01)

(58) Field of Classification Search
None
See application file for complete search history.

(56) References Cited

U.S. PATENT DOCUMENTS

| 2004/0215388 | A1* | 10/2004 | Takenaka | G01C 21/343 340/995.14 |
| 2006/0184314 | A1* | 8/2006 | Couckuyt | G01C 21/3423 340/995.19 |
| 2008/0270016 | A1* | 10/2008 | Proietty | G01C 21/3469 701/425 |

(Continued)

FOREIGN PATENT DOCUMENTS

JP 2004-212160 A 7/2004

*Primary Examiner* — Khoi H Tran
*Assistant Examiner* — Tristan J Greiner
(74) *Attorney, Agent, or Firm* — McDermott Will & Emery LLP

(57) ABSTRACT

An information processor includes a route evaluation unit, a route selection unit, and a course creation unit. The route evaluation unit calculates route evaluation points for each of proposed routes in each of segments, on the basis of a condition of a road in the relevant one of the proposed routes. The segments are coupled between respective two nearest neighbors of a sequence from a starting point to a destination point through one or more via-points. The route selection unit selects, on the basis of the route evaluation points, one proposed route from the proposed routes for each of the segments. The course creation unit connects the proposed routes selected by the route selection unit, to create a course from the starting point to the destination point.

19 Claims, 17 Drawing Sheets

(56) References Cited

U.S. PATENT DOCUMENTS

| | | | |
|---|---|---|---|
| 2012/0095675 A1* | 4/2012 | Tom | G01C 21/343 |
| | | | 701/425 |
| 2014/0129139 A1* | 5/2014 | Ellison | B60L 53/67 |
| | | | 701/533 |
| 2015/0006077 A1* | 1/2015 | Baid | G01C 21/3614 |
| | | | 701/538 |
| 2015/0198449 A1* | 7/2015 | Okude | G08G 1/00 |
| | | | 701/408 |
| 2015/0204685 A1* | 7/2015 | Gearhart | G01C 21/3682 |
| | | | 701/533 |
| 2015/0377639 A1* | 12/2015 | Sofinski | G01C 21/343 |
| | | | 701/411 |
| 2017/0016733 A1* | 1/2017 | Rolf | G01C 21/343 |
| 2018/0107216 A1* | 4/2018 | Beaurepaire | G01C 21/3815 |

\* cited by examiner

FIG. 6A

◆ INCENTIVE FACTOR

| CATEGORY | INCENTIVE POINTS | ROAD TYPE | DEFINITION |
|---|---|---|---|
| LOCATION | +5 ~ +10 | TUNNEL | A TUNNEL OF A LENGTH OF X KILOMETERS OR MORE, IN WHICH THE INCENTIVE POINTS VARY WITH ITS LENGTH |
| | +10 | SEASIDE | A ROAD OF A DISTANCE OF X KILOMETERS OR LESS FROM A COASTLINE |
| | +10 | IN A FOREST | A ROAD SURROUNDED BY TREES |
| | +5 ~ +10 | LONG FOREST ROAD | A ROAD OF A LENGTH OF X KILOMETERS OR MORE, ALONG A FOREST AT ONE SIDE, IN WHICH THE INCENTIVE POINTS VARY WITH ITS LENGTH |
| | +10 | MOUNTAIN PATH | A ROAD OF A CHANGE IN ELEVATION OF X KILOMETERS OR MORE FROM THE STARTING POINT |
| | +5 | TORRENT AND RIVERSIDE | A ROAD OF A DISTANCE OF X KILOMETERS OR LESS FROM A RIVER |
| | +5 | PORT TOWN | A ROAD OF A DISTANCE OF X KILOMETERS OR LESS FROM AROUND A PORT LARGE VESSELS VISIT |
| | +5 | BRIDGE | A BRIDGE THAT HAS A LENGTH OF X KILOMETERS OR MORE AND IS HIGH ENOUGH TO ALLOW A VEHICLE TO TRAVEL |
| | +5 | CLIFF | WITH A DISTANCE OF X KILOMETERS OR LESS FROM A COASTLINE, AND WITH Y KILOMETERS OR MORE ABOVE SEA LEVEL |
| | +10 | FEELING THE PRESENCE OF THE SEA BELOW | WITH A DISTANCE OF X KILOMETERS TO Y KILOMETERS FROM INCLUSIVE A COASTAL ROAD |
| CURVE AND STRAIGHT LINE | +15 | WINDING | A ROAD INCLUDING TWO OR MORE SUCCESSIVE ROAD SEGMENTS HAVING A ROAD CROSSING ANGLE SMALLER THAN X DEGREES |
| | +5 | SHARP CURVE | A ROAD HAVING A ROAD CROSSING ANGLE OF X DEGREES OR MORE |
| | +10 | LOOP BRIDGE | A SPIRAL ROAD |
| | +10 ~ +20 | LONG STRAIGHT LINE | A CONTINUOUS STRAIGHT LINEAR ROAD FOR A LENGTH OF X KILOMETERS OR MORE, IN WHICH THE INCENTIVE POINTS VARY WITH ITS LENGTH |
| CHANGE IN ELEVATION | +15 | STEEP UPWARD SLOPE | WITH A CHANGE IN ELEVATION OF X METERS OR MORE, AND A DISTANCE OF Y KILOMETERS OR LESS |
| | +5 | GENTLE DOWNWARD SLOPE | A ROAD INCLUDING AN UPWARD SLOPE HAVING A CHANGE IN ELEVATION OF PLUS A DEGREES OR MORE AND A DOWNWARD SLOPE HAVING A CHANGE IN ELEVATION OF MINUS Y DEGREES OR LESS |
| | +10 | HILL | |
| ROAD PROPERTIES | +10 | WIDE ROAD | WITH A ROAD WIDTH OF X METERS OR MORE |
| | +5 | GRAVEL ROAD | A ROAD HAVING A ROAD SURFACE MAINLY OF GRAVEL |
| | +5 | EASY ROAD | STRAIGHT LINE, PAVED, AND INCLUDING THREE OR MORE LANES |
| | +15 | SHORT ROAD | |
| | +5 | BUMPY ROAD | A ROAD WHERE THE SNOW IS HARD TO MELT, OR A SNOW COVERED ROAD |
| | +5 | BUSHY ROAD | A ROAD HAVING ROUGHNESS |
| | +5 | NEW ROAD | A ROAD WHERE ROAD EASILY ACCUMULATES |
| | | | A ROAD OPENED IN THE LAST X MONTHS |
| WEATHER | +X ~ -X | SUNNY AND FINE | |
| | +X ~ -X | RAINFALL | |
| | +X ~ -X | SNOWFALL | |
| USER FEEDBACK | +X | WELL-REPUTED ROAD | |

FIG. 6B

◆ DEMERIT FACTOR

| CATEGORY | DEMERIT POINTS | ROAD TYPE | DEFINITION |
|---|---|---|---|
| ROAD PROPERTIES | -5 | ROAD LACKING A CHALLENGE | LACKING DISCOVERY GAIN, OR INCLUDING A SPOT THAT IS NOT LOCALLY UNIQUE |
| | -5 | STANDARD ROAD | LACKING DISCOVERY GAIN, OR HIGHLY PROMOTED BUT INCLUDING TOURIST FACILITIES |
| | -10 | TOO SHORT TRAVEL TIME | TAKES X MINUTES OR LESS TO TRAVEL THE SEGMENT |
| | -15 | ROAD THAT IS STRESSFUL TO TRAVEL | A ROAD THAT IS CROWDED OR EVERY PLANNED DATE OF THE ROUTE |
| | -10 | NARROW ROAD THAT CAUSES DIFFICULTY IN PASSING EACH OTHER | A ROAD INCLUDING ONE LANE FOR A CONTINUOUS DISTANCE OF X KILOMETERS OR MORE |
| | -10 | ROAD WITH MANY TRAFFIC LIGHTS | ADJACENT TRAFFIC LIGHTS ALONG THE WAY ARE SPACED APART BY A DISTANCE OF X METERS OR LESS |
| USER FEEDBACK | -X | ILL-REPUTED ROAD | |

| LEVEL-3 | CONDITIONS TO BE SET FOR EACH SPOT |
|---|---|
| | FACILITIES WITH A PARKING LOT NEARBY |
| | FACILITIES HAVING A REST ROOM |
| | A REST STOP |
| LEVEL-2 | THREE OR MORE TO BE INCLUDED IN THE COURSE |
| | A LOCALLY WELL-KNOWN SHOP |
| | A SHOP THAT SELLS EXTRAORDINARY ITEMS |
| | A SPOT WITH HISTORY |
| | A PLACE CONCERNING A LEGEND |
| | A NATURAL MONUMENT |
| | A ROADSIDE STATION |
| | A PRIVATELY MANAGED SHOP |
| | A SHOP THAT DEALS WITH LOCALLY-GROWN AND LOCALLY-CONSUMED FOOD |
| | A SHOP RECOMMENDED BY A TV STAR |
| LEVEL-1 | ONE OR MORE TO BE INCLUDED IN THE COURSE |
| | A SPOT WITH A SUPERB VIEW |
| | A THEME PARK FOR, WITHOUT LIMITATION, ANIMALS, ALLIGATORS, PLANTS, OR FLOWERS |
| | FRUIT PICKING FOR, WITHOUT LIMITATION, STRAWBERRIES OR KIWI FRUITS |
| | A CAFE FOR, WITHOUT LIMITATION, BREAD, SANDWICHES, RICE BALLS AND SWEETS |
| | AN ART GALLERY |
| | A MUSEUM |
| | AN AQUARIUM |
| | ATTRACTION FACILITIES FOR ENTERTAINMENT OF BOTH CHILDREN AND ADULTS |
| | A JAPANESE STYLE CONFECTIONARY STORE |
| | VIRTUAL EXPERIENCE FACILITIES |
| | AN OLD PRIVATE HOUSE |
| | A PARK |
| | A FOOTBATH |
| | A SANDY BEACH |
| | A SWIMMING BEACH |
| | A CAVE |
| | A ROCKY MOUNTAIN |
| | A LIFT |
| | A SHRINE |
| | A LIGHTHOUSE |
| | A CAPE |
| | AN OBSERVATION DECK |
| | A WALKWAY |
| | A WATERFALL |
| | ... |

FIG. 7

INFORMATION PROCESSOR, INFORMATION PROCESSING METHOD, AND COMPUTER-READABLE RECORDING MEDIUM

CROSS-REFERENCE TO RELATED APPLICATIONS

This application claims priority from Japanese Patent Application No. 2019-157226, filed on Aug. 29, 2019, the entire contents of which are hereby incorporated by reference.

BACKGROUND

The technology relates to an information processor, an information processing method, and a computer-readable recording medium. Specifically, the technology relates to route creation techniques for vehicle travel.

On-vehicle navigation devices have come in wide use. They offer a proposed route on a map, in response to an input of, for example, a starting point and a destination point. They also provide route guidance on travel.

Japanese Unexamined Patent Application Publication (JP-A) No. 2004-212160 describes a technique regarding a navigation device that searches routes in accordance with a driver's various requests.

SUMMARY

An aspect of the technology provides an information processor including a route evaluation unit, a route selection unit, and a course creation unit. The route evaluation unit is configured to calculate route evaluation points for each of proposed routes in each of segments, on the basis of a condition of a road in the relevant one of the proposed routes. The segments are coupled between respective two nearest neighbors of a sequence from a starting point to a destination point through one or more via-points. The route selection unit is configured to select, on the basis of the route evaluation points, one proposed route from the proposed routes for each of the segments. The course creation unit is configured to connect the proposed routes selected by the route selection unit, to create a course from the starting point to the destination point.

An aspect of the technology provides an information processing method including: calculating route evaluation points for each of proposed routes in each of segments, on the basis of a condition of a road in the relevant one of the proposed routes, the segments being coupled between respective two nearest neighbors of a sequence from a starting point to a destination point through one or more via-points; selecting, on the basis of the route evaluation points, one proposed route from the proposed routes for each of the segments; and connecting the proposed routes selected by the selecting, to create a course from the starting point to the destination point.

An aspect of the technology provides a computer-readable recording medium containing a program. The program causes, when executed by a computer, the computer to implement a method, the method including: calculating route evaluation points for each of proposed routes in each of segments, on the basis of a condition of a road in the relevant one of the proposed routes, the segments being coupled between respective two nearest neighbors of a sequence from a starting point to a destination point through one or more via-points; selecting, on the basis of the route evaluation points, one proposed route from the proposed routes for each of the segments; and connecting the proposed routes selected by the selecting, to create a course from the starting point to the destination point.

An aspect of the technology provides an information processor including circuitry. The circuitry is configured to calculate route evaluation points for each of proposed routes in each of segments, on the basis of a condition of a road in the relevant one of the proposed routes. The segments are coupled between respective two nearest neighbors of a sequence from a starting point to a destination point through one or more via-points. The circuitry is configured to make selection of one proposed route from the proposed routes for each of the segments, on the basis of the route evaluation points. The circuitry is configured to connect the proposed routes selected by the selection, to create a course from the starting point to the destination point.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIGS. 6A and 6B are charts of contents of information in an evaluation information database according to the example embodiment.

FIG. 7 is a chart of contents of information in a requisite spot database according to the example embodiment.

DETAILED DESCRIPTION

Figure 1:
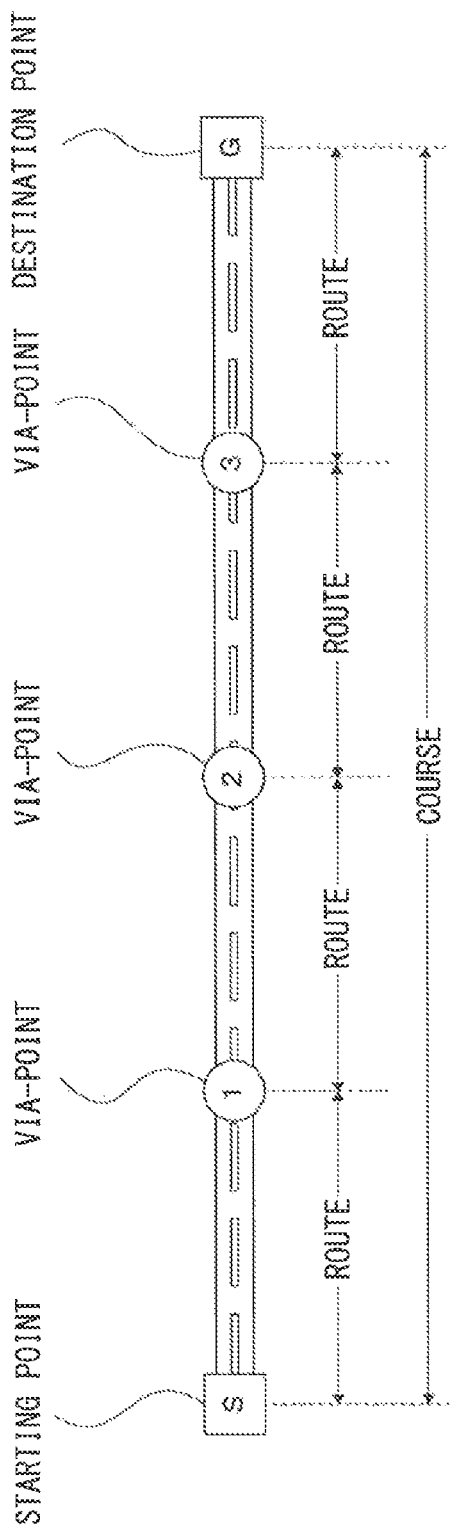
FIG. 1 is a schematic diagram of definitions of terms used in this specification.

Existing navigation devices create a course as a path from a starting point to a destination point. They generally tend to create an efficiency-oriented course, e.g., a course having a distance as short as possible to the destination point, and a course it takes as short time as possible to reach the destination point.

Meanwhile, there are also calls for non-efficiency-oriented route creation to a destination point, to make it possible to give a user great travel experience such as joy of travel and fine scenery.

It is desirable to provide an information processor, an information processing method, and a computer-readable recording medium that make it possible to effectively create an appropriate course that matches a condition of a road in view of, for example, joy of travel and fine scenery, as a route from a starting point to a destination point through one or more via-points.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

Definitions of Terms

First, with reference to FIG. 1, definitions are given of terms to be used hereinbelow.

A "course" refers to a whole path from a starting point of route guidance to a destination point, i.e., a goal point. Route guidance includes setting a course in accordance with an input of the starting point and the destination point.

A "via-point" is a generic name of places to stop by and places to pass through on the course. Such places may include a "stop-by spot" and a "nice-moment place". Course creation may include setting information indicating a sequence of passing through via-points. In the example in FIG. 1, annular frames indicate via-points, and numerical values inside the annular frames indicate the sequence of passing through the via-points.

A "stop-by spot", or a spot to stop by, refers to a place set on the course as a place to stop by before arrival at the destination point. Non-limiting examples of the "stop-by spot" may include facilities, scenic spots, restaurants, and rest houses.

A "nice-moment place", or a place for a nice moment, refers to a location or a road passing through which is expected to give a user great experience. In a case where the user travels along the course by a vehicle, the "nice-moment place" may include a location or a road where performance and appealingness of the vehicle the user is aboard are easily appreciated. Such a location or a road may be selected on the basis of characteristics of a vehicle model of the relevant vehicle. Non-limiting examples of the characteristics of the vehicle model of the vehicle may include specifications and the performance of the vehicle. A "location" as used here may include a point, an area, a section, a region, and a range, as a certain place. A "road" as used here may include all sections of a road, e.g., a range that is given a road name, or alternatively, the "road" as used here may include some of the sections of the road.

A "route" refers to a path between any two nearest neighbors of a sequence from the starting point to the destination point through the via-points. For example, a path from the starting point to the first via-point is called a "route". A path from the first via-point to the next via-point is called a "route". A path from the last via-point to the destination point is called a "route".

1. First Embodiment (1-1. Configuration Example of Information Processor)

Figure 2:
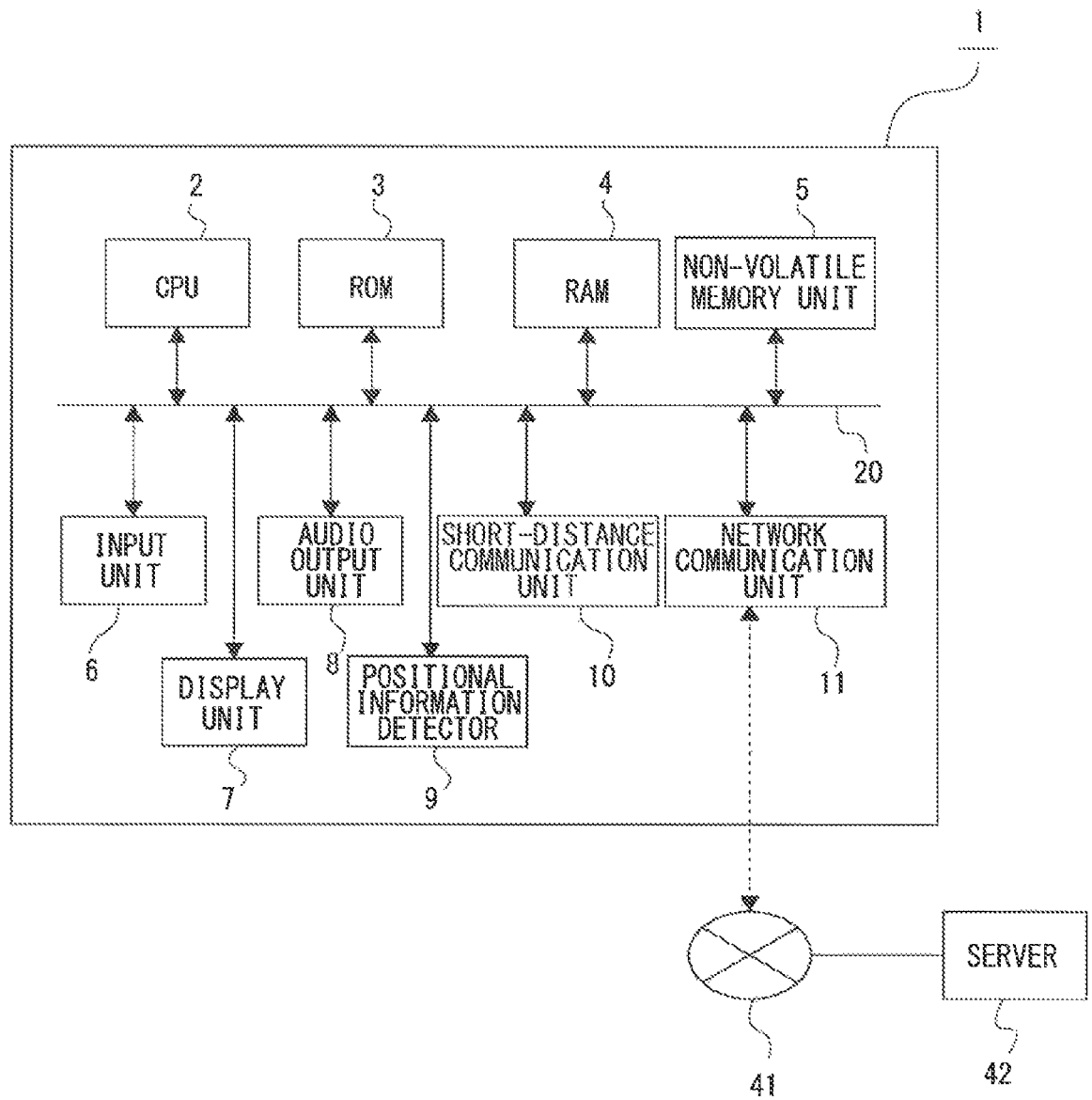
FIG. 2 is a block diagram of a configuration example of an information processor according to an example embodiment of the technology.

With reference to FIG. 2, described is a configuration example of an information processor 1 according to an example embodiment of the technology.

The information processor 1 may be a mobile terminal device such as a smartphone and a tablet information processor. However, this is non-limiting. Specific but non-limiting examples of the information processor 1 may cover a wide range of devices such as personal computers, mobile phones, game machines, audio devices, and video devices. The information processor 1 is implementable by a device that is able to perform operations as information processing, e.g., a device that incorporates a microcomputer.

In this example embodiment, the information processor 1 is assumed to be used in the route guidance, inside a vehicle where the route guidance is provided.

As illustrated in FIG. 2, the information processor 1 may include a central processing unit (CPU) 2, a read only memory (ROM) 3, a random access memory (RAM) 4, a non-volatile memory unit 5, an input unit 6, a display unit 7, an audio output unit 8, a positional information detector 9, a short-distance communication unit 10, and a network communication unit 11. These units may be coupled to one another by a bus 20, allowing for exchanges of, for example, control signals, data, and detection signals between them as necessary.

The CPU 2 may execute various processing in accordance with a program held by the ROM 3 or a program loaded in the RAM 4 from the non-volatile memory unit 5. The RAM 4 may also hold, as appropriate, data involved in the execution of the various processing by the CPU 2.

The non-volatile memory unit 5 may include, without limitation, a hard disk drive (HDD) and a flash memory. The non-volatile memory unit 5 may hold an application program that carries out processing of this example embodiment and carries out navigation as the route guidance. Moreover, the non-volatile memory unit 5 may also hold map information, route information calculated for the navigation, and various kinds of sound data and image data for use in the navigation.

Furthermore, the non-volatile memory unit 5 may also hold information involved in the processing of this example embodiment. Non-limiting examples of such information may include a stop-by spot database, a nice-moment place database, an evaluation information database, and a requisite spot database. The stop-by spot database is provided for management of the stop-by spot as mentioned above. The nice-moment place database is provided for management of the nice-moment place as mentioned above. The evaluation information database is provided for management of evaluation information used in route evaluation. The route evaluation may be carried out in creating a proposed course for the route guidance. The requisite spot database is provided for management of information regarding various spots selected as a requisite to be included in a created course. In the following description, the database is abbreviated to "DB".

The stop-by spot DB is a database of information regarding places that make proposed stop-by spots.

The nice-moment place DB is a database of information regarding locations and roads that make proposed nice-moment places.

In other words, the stop-by spot DB and the nice-moment place DB are databases that hold information regarding places that make proposed via-points.

It is to be noted that the evaluation information DB and the requisite spot DB are described later.

The input unit 6 may comprehensively denote various operators and operation devices such as a keyboard, a mouse, a key, a dial, a touchscreen, a touchpad, and a remote controller. An operation made by the user may be detected by the input unit 6, causing generation of a signal corresponding to the operation thus inputted. The signal may be interpreted by the CPU 2.

The display unit 7 may include a display device such as a liquid crystal display (LCD) and an organic electroluminescence (EL) panel. The display unit 7 may provide the user with display of various kinds of information. The display device included in the display unit 7 may be provided in a housing of the information processor 1, but this is non-limiting. The display device included in the display unit 7 may be a separate display device coupled to the information processor 1.

The display unit 7 may display various images on a display screen, on the basis of instructions from the CPU 2. Moreover, the display unit 7 may provide graphical use interface (GUI) display such as, but not limited to, various operation menus, icons, and messages, on the basis of the instructions from the CPU 2.

The audio output unit 8 may include, for example, a speaker and an amplifier. The audio output unit 8 may output various sounds based on the instructions from the CPU 2. For example, the audio output unit 8 may output audio guidance, on the occasion of the route guidance.

The positional information detector 9 may include a global navigation satellite system (GNSS) sensor. The positional information detector 9 may detect a current position of the information processor 1. Information representing the current position of the information processor 1 detected by the positional information detector 9 may be supplied to the CPU 2 as current positional information. The current positional information inputted to the CPU 2 may be used in processing for the route guidance.

The short-distance communication unit 10 may communicate with various devices, by short-distance wireless communication such as, but not limited to, Bluetooth (registered trademark), Wi-Fi (registered trademark) communication, and near field communication (NFC), and/or by wired communication through, for example, a universal serial bus (USB).

The CPU 2 is able to carry out various data communication with, for example, an information processor provided on vehicle side, through the short-distance communication unit 10.

The network communication unit 11 may perform communication processing through a network 41.

The network 41 may be, for example, the Internet, a local area network (LAN), a satellite communication network, or any other network.

The CPU 2 is able to carry out various data communication with an external device coupled to the network 41, through the network communication unit 11. In particular, in this example embodiment, the CPU 2 is able to carry out various data communication with an external server 42, through the network communication unit 11.

(1-2. CPU in First Embodiment)

Figure 3:
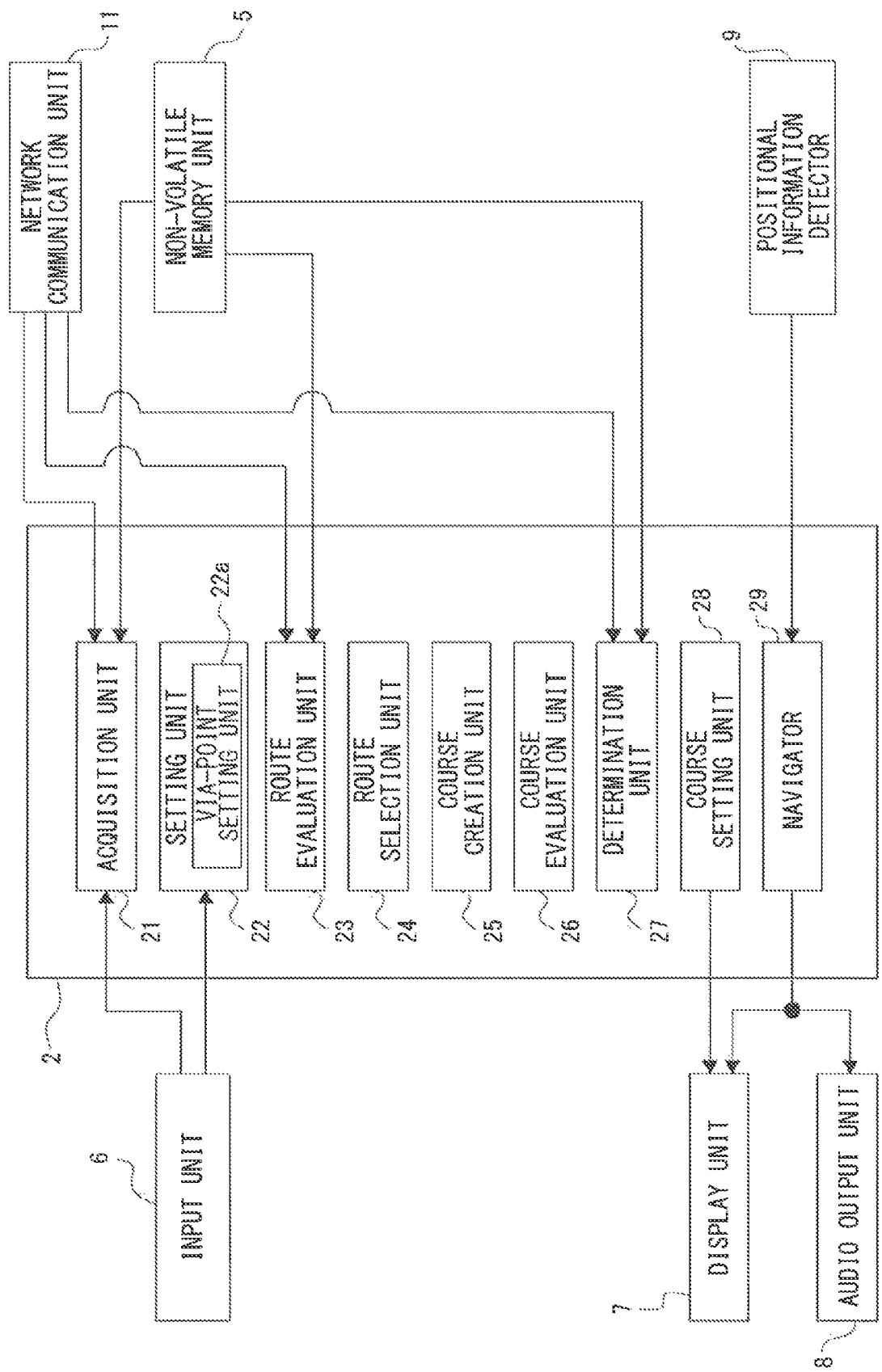
FIG. 3 is a block diagram of a CPU of the information processor according to a first embodiment.

FIG. 3 is a diagram provided for description of a detailed configuration of the CPU 2 of the information processor 1. In FIG. 3, subunits in the CPU 2 are illustrated, together with some related units illustrated in FIG. 1.

As illustrated in the figure, the CPU 2 may include an acquisition unit 21, a setting unit 22, a route evaluation unit 23, a route selection unit 24, a course creation unit 25, a course evaluation unit 26, a determination unit 27, a course setting unit 28, and a navigator 29.

The acquisition unit 21 may acquire proposed via-points. In other words, the acquisition unit 21 may acquire information regarding the stop-by spot and the nice-moment place that make the proposed via-points. Such information may be held by the stop-by spot DB and the nice-moment place DB as described above, in the non-volatile memory unit 5.

In one alternative, regarding the acquisition of the proposed via-points, the stop-by spot DB and the nice-moment place DB may be provided in the external server 42. In this case, the acquisition unit 21 may acquire the proposed via-points from the server 42 through the network communication unit 11.

The setting unit 22 may set the starting point, one or more via-points, and the destination point. That is, the setting unit 22 may set the starting point, the via-points, and the destination point, to create a course to be traveled under the route guidance.

In this example, the setting unit 22 may set the starting point and the destination point on the basis of an input of the operation by the user through the input unit 6. The input of the starting point and the destination point may be accepted by, for example, a designation input on a map displayed on the display unit 7, and/or a character input, without limitation.

Moreover, in this example, the setting unit 22 may serve as a via-point setting unit 22a with respect to setting of the via-points. The via-point setting unit 22a may set one or more via-points, out of the proposed via-points acquired by the acquisition unit 21, as via-points to be used in course creation. In this example, the via-point setting unit 22a may set a plurality of via-points in creating a single course.

The route evaluation unit 23 calculates route evaluation points Vr for each of proposed routes in each of segments S, on the basis of a condition of a road in the relevant one of the proposed routes. The segments S are coupled between respective two nearest neighbors of a sequence from the starting point to the destination point through the one or more via-points. The segments S are also referred to as parts of the whole path from the starting point to the destination point, separated by the via-points. For example, as illustrated in FIG. 1 mentioned above, assume that the three via-points are set between the starting point and the destination point. In this case, the four segments S are formed: the segment S from the starting point to the first via-point; the segment S from the first via-point to the second via-point; the segment S from the second via-point to the third via-point; and the segment S from the third via-point to the destination point.

Each of the segments S has one end, i.e., a beginning end, and another end, i.e., a termination end. The route evaluation unit 23 may search for a plurality of routes between the beginning end and the termination end, for each of the segments S. The plurality of the routes is referred to as the proposed routes. The route evaluation unit 23 may search for the proposed routes for each of the segments S, and calculate the route evaluation points Vr for each of the proposed routes thus searched for, on the basis of the condition of the road in the relevant one of the proposed routes.

In this example, the condition of the road may include a position of the road, a feature of the road, weather on the road, or public reputation of the road, or any combination thereof. In one specific but non-limiting example, the position of the road and the feature of the road may be a position and a feature of a road that are selected from viewpoint of capability of giving the user great travel experience, such as fully appreciation of joy and pleasure of travel, fully appreciation of kinematic performance of the vehicle, e.g., power performance and suspension performance, and evocation of the sense of adventure. Specific but non-limiting examples of the position and the feature of such a road may include a mountain path, a winding road, and the seaside. The position and the feature of the road as exemplified above have good scenery, contributing to the pleasure of travel.

The weather on the road is the condition of the road related, mainly, to the pleasure of travel. For example, the fine weather enhances the pleasure of travel.

The public reputation of the road is the condition of the road such as strong popularity among, for example, remarks on the Internet.

Calculating the route evaluation points Vr under an evaluation criterion based on the condition of the road as described above makes it possible to evaluate the proposed routes under a criterion as to whether or not the proposed route is able to give great travel experience to the user.

The route evaluation unit 23 may use storage information in the evaluation information DB held by the non-volatile memory unit 5, to evaluate the proposed routes under the evaluation criterion based on the condition of the road. Although details are described later, the evaluation information DB may be a database that holds information indicating corresponding relation of the condition of the road to the number of points to be reflected in the route evaluation points Vr in a case where the condition is met.

It is to be noted that, as with the stop-by spot DB and the nice-moment place DB as mentioned above, the evaluation information DB may also be provided in the external server 42. In this case, the route evaluation unit 23 may acquire the storage information in the evaluation information DB from the server 42 side through the network communication unit 11.

In this example, in searching for the proposed routes for each of the segments S, the route evaluation unit 23 may search for a route that satisfies a condition that necessary time is shorter than predetermined time. This prevents necessary time for the entire course from becoming unduly long.

The route selection unit 24 selects, on the basis of the route evaluation points Vr, one proposed route from the proposed routes for each of the segments S. For example, the route selection unit 24 may select one proposed route from the proposed routes, on the basis of the number of the route evaluation points Vr. In one specific but non-limiting example, the route selection unit 24 of this example may select whichever proposed route has the greatest number of the route evaluation points Vr, for each of the segments S.

In a case with presence of a plurality of the proposed routes having the greatest number of the route evaluation points Vr, the route selection unit 24 may select one proposed route in accordance with a predetermined condition. For example, the route selection unit 24 may make selection based on the necessary time or a distance. That is, the route selection unit 24 may select whichever proposed route has the shortest necessary time or the shortest distance. Alternatively, the route selection unit 24 may make selection in consideration of connection with the preceding proposed route and the subsequent proposed route selected for the neighboring segments S. For example, assume a case where the plurality of the proposed routes having the greatest number of the route evaluation points Vr include the proposed route including a seaside road and the other proposed routes. In this case, when the preceding proposed route includes a seaside road, the route selection unit 24 may make selection from the other proposed routes than the proposed route including the seaside road. This prevents only the seaside roads from being selected along the course.

The course creation unit 25 connects the proposed routes selected by the route selection unit 24, to create a course from the starting point to the destination point. It is, therefore, unnecessary to evaluate all combinations of the proposed routes assumed in the respective segments S from the starting point to the destination point, in creating the course under the predetermined evaluation criterion based on the condition of the road. This leads to enhanced efficiency of the course creation.

In the course creation, the course creation unit 25 in this example is configured to create a different course from a distance-oriented or necessary-time-oriented course. In one specific but non-limiting example, the course creation unit 25 may perform route search from the starting point to the destination point through the via-points, with the use of a distance-oriented or necessary-time-oriented route search algorithm, to create a course for comparison. The course creation unit 25 may determine whether or not the course for comparison matches the course created by connecting the proposed routes selected by the route selection unit 24 as described above. In a case where the two courses match, the course creation unit 25 may change a combination of the via-points to be set and/or the sequence of passing through the via-points, to create the course again. The course creation unit 25 may make a similar determination as to the course thus created again. Performing such processing makes it possible to create the different course from an efficiency-oriented course such as the distance-oriented or necessary-time-oriented course.

The course evaluation unit 26 may calculate course evaluation points Vc under a predetermined evaluation criterion, with respect to the course created by the course creation unit

25. In this example, the course evaluation unit 26 may calculate, as the course evaluation points Vc, a total value of the route evaluation points Vr calculated for the proposed routes selected for the respective segments S.

The determination unit 27 may make a determination as to whether or not the course created by the course creation unit 25 satisfies a predetermined condition other than the condition based on the route evaluation points Vr. In one specific but non-limiting example, the determination unit 27 in this example may determine whether or not the course includes a predetermined requisite place to be included in the course, as the determination as to whether or not the course created by the course creation unit 25 satisfies the predetermined condition.

As described above, the non-volatile memory unit 5 may hold the requisite spot DB. The requisite spot DB is provided for the management of the information regarding the various spots selected as the requisite to be included in the course. The determination unit 27 may determine whether or not the requisite spot is included in the created course, on the basis of the information of the requisite spot DB.

It is to be noted that details of the determination are described later again. The requisite spot DB may be provided in the external server 42, rather than in the non-volatile memory unit 5. In this case, the determination unit 27 may acquire the storage information of the requisite spot DB from the server 42 side through the network communication unit 11.

The course setting unit 28 may set the course created by the course creation unit 25 as a proposed course Cc for the route guidance, on the basis of the course evaluation points Vc. In one specific but non-limiting example, the course setting unit 28 may set the created course as the proposed course Cc in a case with a determination that the number of the course evaluation points Vc is equal to or greater than a predetermined reference value. The predetermined reference value is hereinafter referred to as a "threshold TH".

Figure 9:
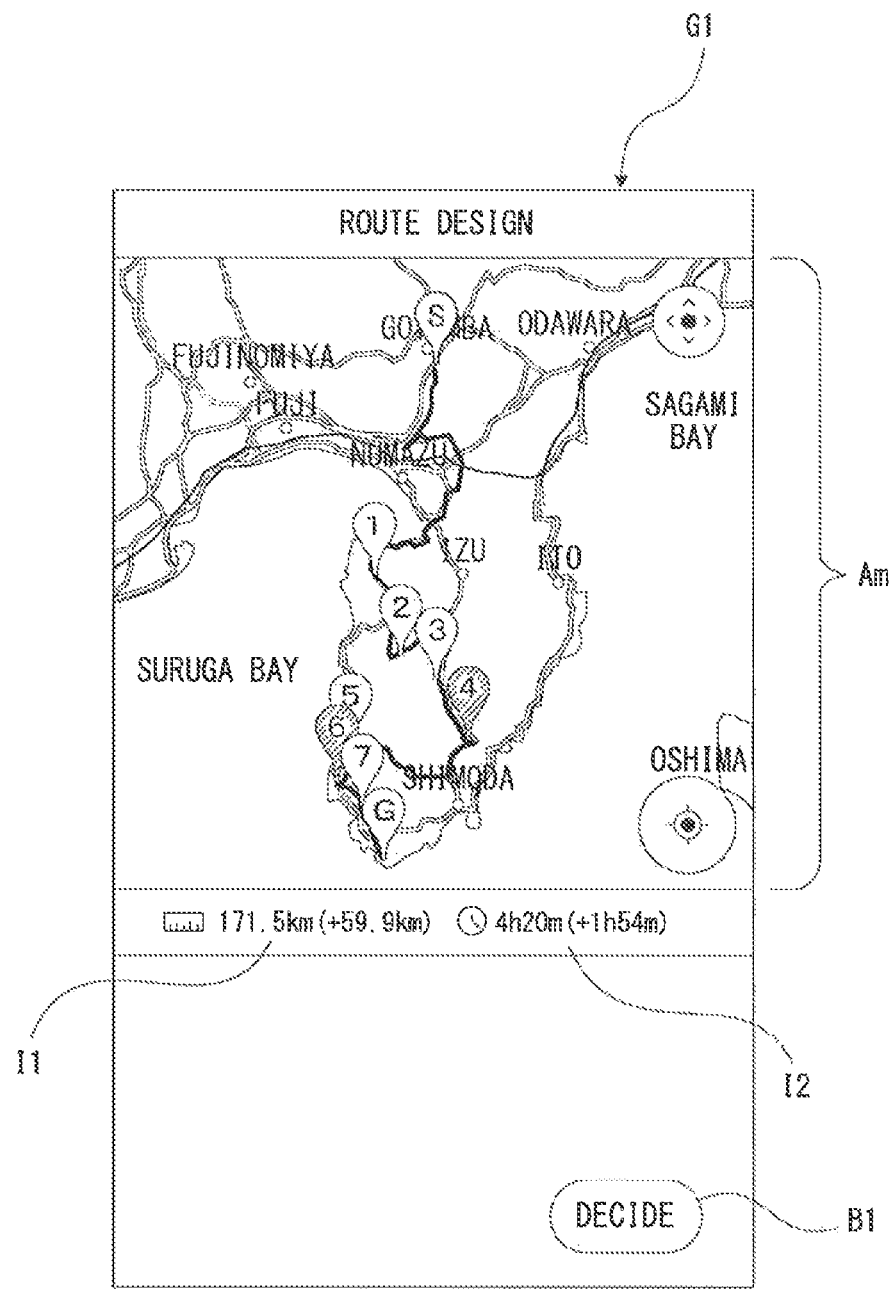
FIG. 9 is a diagram of an example of a confirmation display screen according to the first embodiment.

The course setting unit 28 may allow information representing the proposed course Cc to be displayed on the screen of the display unit 7. Refer to FIG. 9 described later. As the information representing the proposed course Cc, the course setting unit 28 may allow, for example, a line representing the course and marks representing the respective via-points to be displayed on a map.

Displaying the proposed course Cc as described above makes it possible to allow the user to check whether or not to set the proposed course Cc as the course for the route guidance. In this example, in displaying the information representing the proposed course Cc, the course setting unit 28 may provide, on the screen, GUI display of an operator that allows the user to input an instruction to set the proposed course Cc as the course for the route guidance. In response to an operation on the operator, the course setting unit 28 may set the proposed course Cc as the course for the route guidance. Details are described later.

It is to be noted that in the following, the course for the route guidance is referred to as a "guidance course Cg".

Here, the course setting unit 28 may revise the course in a case with a determination that the number of the course evaluation points Vc is smaller than the threshold TH. Such revision of the course may be made by changing the combination of the via-points to be set and/or the sequence of passing through the via-points to perform the course creation again.

Moreover, the course setting unit 28 is configured to set the course created by the course creation unit 25 as the proposed course Cc, in a case where the determination unit 27 determines that the forgoing condition, i.e., the condition regarding the requisite spot, is satisfied. That is, the course setting unit 28 in this example may set the created course as the proposed course Cc, in a case where the following conditions are both satisfied: the condition that the number of the course evaluation points Vc is equal to or greater than the threshold TH; and the condition that the requisite spot is included in the created course.

The navigator 29 may perform processing for the route guidance to the destination point, on the basis of the current positional information inputted from the positional information detector 9 and the information regarding the guidance course Cg. In one specific but non-limiting example, the navigator 29 may perform processing of outputting the audio guidance through the audio output unit 8 and/or outputting an image for the route guidance to be displayed by the display unit 7.

It is to be noted that here is given an example where the information for the route guidance, e.g., the audio guidance and the image for the route guidance, is outputted by the output unit provided in the information processor 1 such as the audio output unit 8 and the display unit 7. In one alternative, the information for the route guidance may be outputted by an output unit provided in the vehicle such as a display unit and a speaker, with the use of wired or wireless communication with the vehicle side through the short-distance communication unit 10.

(1-3. Processing Procedure)

Figure 4:
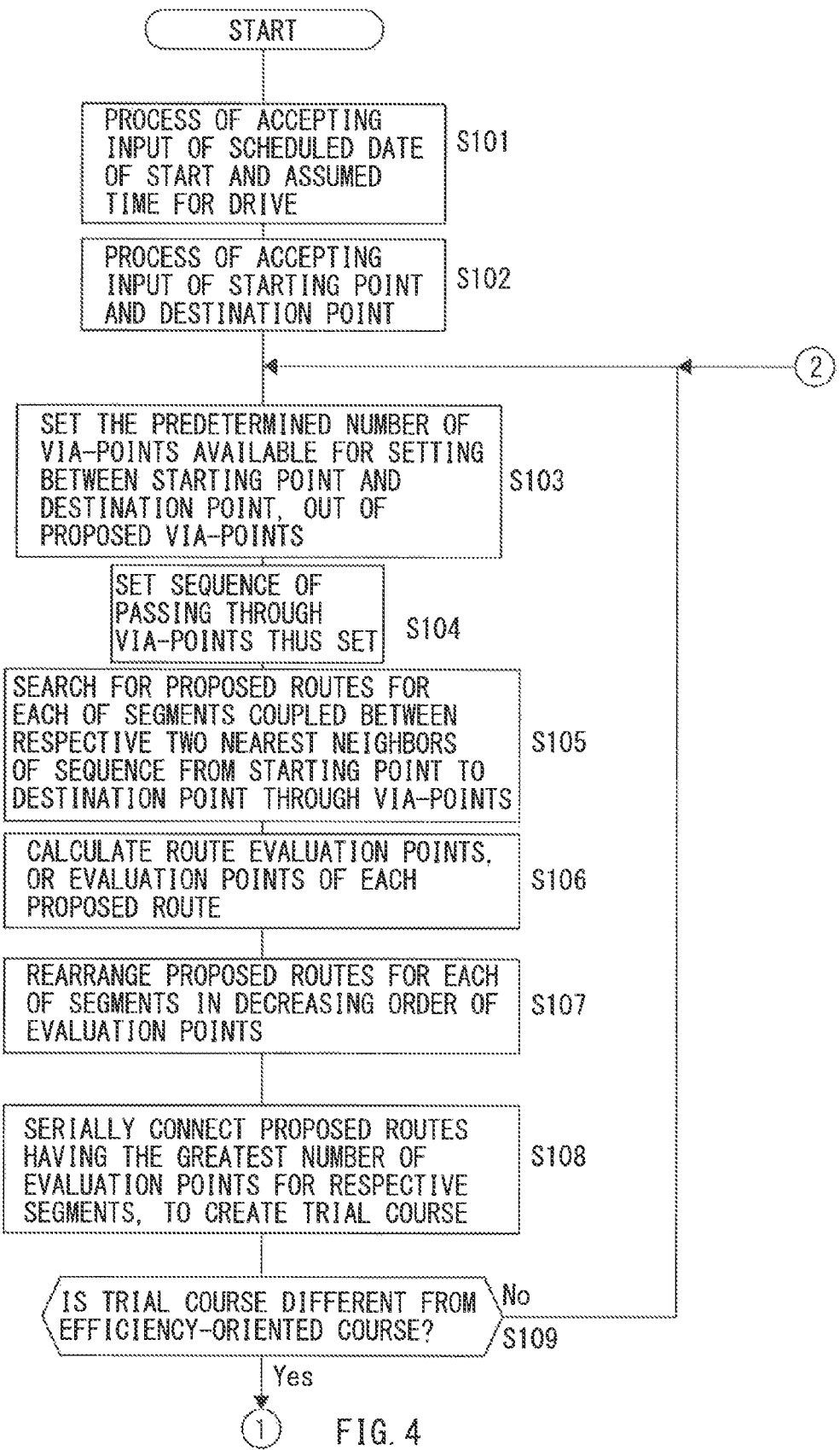
FIG. 4 is a flowchart illustrating a specific example of a procedure of processing to be executed by the CPU according to the first embodiment.
Figure 5:
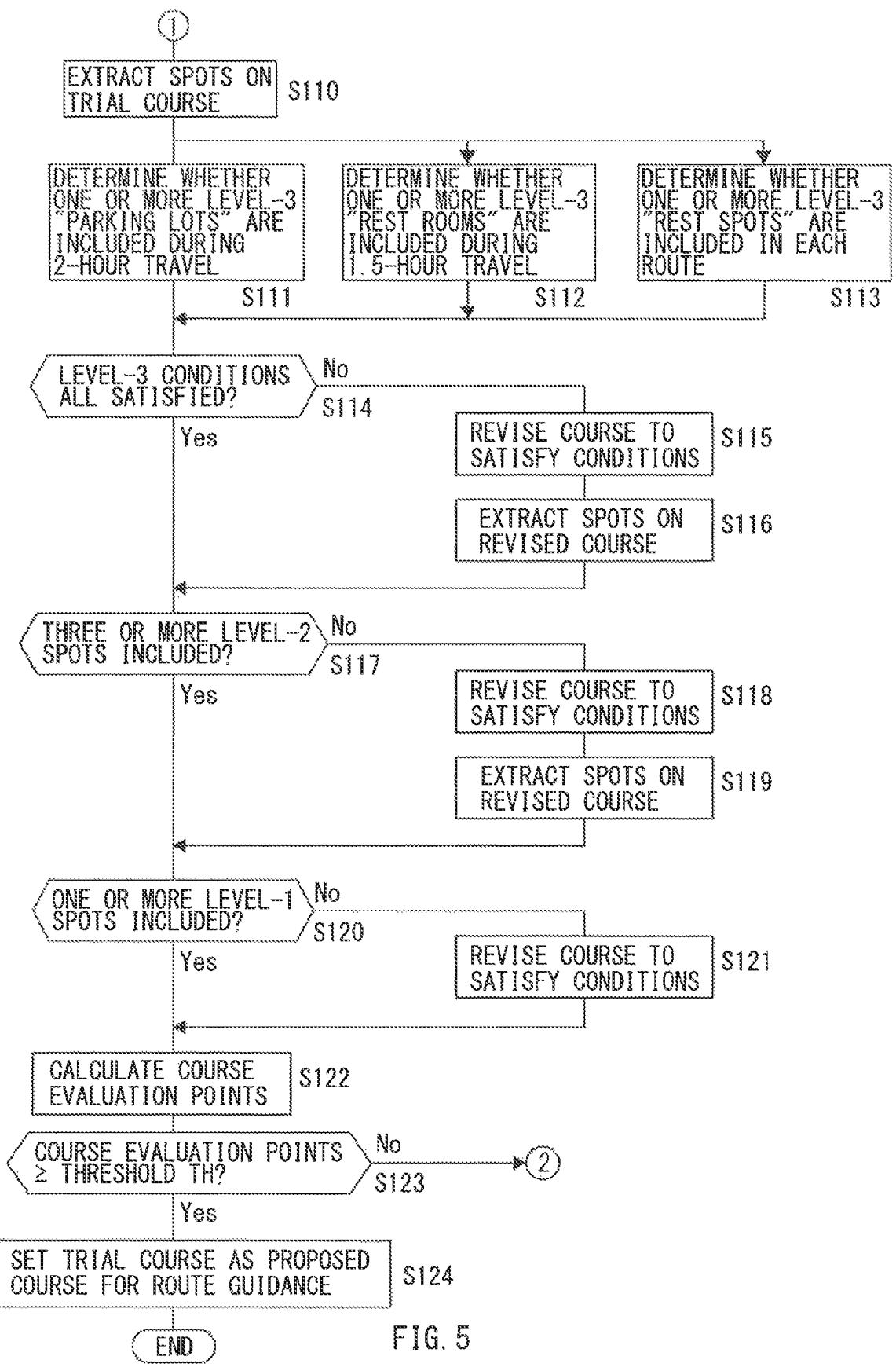
FIG. 5 is a flowchart illustrating, together with FIG. 4, the specific example of the procedure of the processing to be executed by the CPU according to the first embodiment.

With reference to flowcharts in FIGS. 4 and 5, description is given of a specific processing procedure to be executed by the CPU 2, or by the subunits of the CPU 2 according to the first embodiment as described.

FIG. 4 illustrates a procedure corresponding to processing before the course creation.

First, in step S101, the CPU 2 may perform a process of accepting an input of a scheduled date of a start of a drive and assumed time for the drive. The assumed time for the drive means necessary time for the drive assumed by the user themselves.

By the process of step S101, the CPU 2 may accept the input of the scheduled date of the start of the drive and the assumed time for the drive. In response thereto, in step S102, the CPU 2 may perform a process of accepting the starting point and the destination point. As described above, the input of the starting point and the destination point may be accepted by, for example, the designation input on the map displayed on the display unit 7, and/or the character input, without limitation.

In step S102, the CPU 2 may accept the input of the starting point and the destination point. In response thereto, in step S103, the CPU 2 may set the predetermined number of the via-points available for setting between the starting point and the destination point, out of the proposed via-points. In one specific but non-limiting example, the spot-by-spot DB and the nice-moment place DB as mentioned above may manage the proposed via-spots such as the stop-by spot and the nice-moment place. Out of the proposed via-spots, the CPU 2 may set the predetermined number, e.g., a plurality in this example, of the proposed via-points available for the setting in terms of their positional relation to the starting point or the destination point.

In step S104 following step S103, the CPU 2 may set the sequence of passing through the via-points thus set.

In step S104, the CPU 2 may set the sequence of passing through the via-points. In response thereto, in step S105, the CPU 2 may search for the proposed routes for each of the segments S. The segments S are coupled between the respective two nearest neighbors of the sequence from the starting point to the destination points through the via-points. In other words, the CPU 2 may search for the plurality of the proposed routes, for each of the segments S. Each of the plurality of the proposed routes are coupled between the beginning end and the termination end of the relevant one of the segments S. As described above, in searching for the plurality of the proposed routes for each of the segments S, the CPU 2 may search for the route that satisfies the condition that the necessary time is shorter than the predetermined time. This prevents the necessary time for the entire course from becoming unduly long.

In step S105, the CPU 2 may search for the proposed routes. In response thereto, the CPU 2 may cause the flow to proceed to step S106, to calculate evaluation points for each of the proposed routes. That is, the CPU 2 may calculate, with the use of the evaluation information DB mentioned above, the route evaluation points Vr for each of the proposed routes thus searched for.

FIGS. 6A and 6B are charts of contents of the information in the evaluation information DB.

FIG. 6A schematically summarizes contents of information related to incentive factors of the evaluation points. FIG. 6B schematically summarizes contents of information related to demerit factors of the evaluation points.

As illustrated in the figures, the incentive factors and the demerit factors of the evaluation points may be determined for each category of the road to be evaluated. Categories of the incentive factors may include, for example, "location", "curve and straight line", "change in elevation", "road properties", "weather", and "user feedback (FB)". Categories of the demerit factors may include, for example, "road properties" and "user feedback (FB)".

As summarized in the figure, specific but non-limiting examples of "road type" belonging to the category "location" in the incentive factors may include "tunnel", "seaside", "in a forest", "long forest road", "mountain path", "cliff", and "feeling the presence of the sea below".

Specific but non-limiting examples of "road type" belonging to the category "curve and straight line" may include "winding", "sharp curve", and "loop bridge".

Specific but non-limiting examples of "road type" belonging to the category "change in elevation" may include "steep downward slope" and "gentle downward slope".

Specific but non-limiting examples of "road type" belonging to the category "road properties" may include "wide road", "gravel road", and "muddy road".

Specific but non-limiting examples of "road type" belonging to the category "weather" may include "sunny and fine" and "rainfall".

Specific but non-limiting examples of "road type" belonging to the category "user feedback" may include "well-reputed road".

Regarding the demerit factors, specific but non-limiting examples of "road type" belonging to the category "road properties" may include "road lacking a challenge", "too short travel time", "narrow road that causes difficulty in passing each other", and "road with many traffic lights".

In addition, as for the demerit factors, specific but non-limiting examples of "road type" belonging to the category "user feedback" may include "μl-reputed road".

In each of the categories, definitions for each "road type" are summarized in the figures.

Regarding "user feedback", the definitions in the figure are given by terminology such as "the number of users' likes", "the number of positive remarks", and "the number of negative remarks". Such terminology assumes the presence of, for example, a website on the Internet that allows a plurality of users to write, i.e., post, or to browse drive-related information. In one specific but non-limiting example, such a website may accumulate information regarding roads such as a mountain pass and a winding road located in various places, and information regarding evaluation by users who have actually traveled along the roads. Specifically, the information regarding the evaluation by the users may include evaluation information such as "likes" based on binary evaluation values, i.e., whether to prize or not, and evaluation information written as text information. Among these pieces of the evaluation information, a sum of the binary evaluation values of the former corresponds to "the number of users' likes" in the figures. The number of parts including positive remarks extracted from the latter corresponds to "the number of the positive remarks" in the figure. The number of parts including negative remarks extracted from the latter corresponds to "the number of the negative remarks" in the figure.

In the evaluation information DB, for each "road type" as described above, incentive points or demerit points may be determined in corresponding relation thereto. The incentive points take a positive value, while the demerit points take a negative value. The incentive points and the demerit points may determine the number of points to be added to the route evaluation points Vr.

In this example, for some items in "road type", the number of the incentive points may vary with a length of the relevant road. For example, for "tunnel" and "long forest road", the number of the incentive points may be increased in accordance with the length of the relevant road.

In the calculation process of step S106, the CPU 2 may calculate the route evaluation points Vr for each of the proposed routes, on the basis of the information in the evaluation information DB.

In the evaluation information DB in reality, as to the categories other than "weather", for each "road type" in FIG. 6A or 6B, positional information on the relevant road may be held, in association with the information on the incentive points or the demerit points. As to the category "weather", information on points may be held, in respective association with "sunny and fine", "rainfall", and "snowfall".

In the process of step S106, for "road type" of the categories other than "weather", the CPU 2 may search for a road of the relevant "road type" from the route to be evaluated, on the basis of the positional information held by the evaluation information DB as described above. In a case with presence of any road of the relevant "road type", the CPU 2 may acquire a corresponding value of the incentive points or the demerit points. At this occasion, for "road type" in which the number of the points varies with the length of the road, e.g., "tunnel" and "long forest road", the CPU 2 may detect the length of the relevant section of the road on the route to be evaluated. The CPU 2 may acquire the number of the points in accordance with the length detected.

For "road type" belonging to the category "weather", the CPU 2 may acquire, on the basis of information regarding the scheduled date of the start inputted in step S101 and on the basis of information regarding a position or a region of the route to be evaluated, information on weather forecast in the region of the route to be evaluated, from an external weather forecast information source such as a predetermined weather forecast website. In a case where the acquired information on the weather forecast matches "sunny and fine", "rainfall", or "snowfall", the CPU 2 may acquire the corresponding number of the points.

Thus, the CPU 2 may calculate the route evaluation points Vr by summing the acquired points.

For the category "weather", the CPU 2 may vary the number of the points for each of "sunny and fine", "rainfall", and "snowfall" between a positive value and a negative value, in accordance with a type of the course. For example, in some cases, the contents of the user's input such as the scheduled date of the start and the destination point may give a clue to estimation of a weather-related type of the course, e.g., a course that matches the sunny weather, and a course that matches the rainy weather. In this case, the CPU 2 may vary the number of the points for "sunny and fine" and "rainfall" in the corresponding relation to such a type of the course.

Furthermore, the CPU 2 may change the points for "well-reputed road" in "user feedback", to a value corresponding to a value calculated by the following calculation expression as given in the figure: (coefficient×the number of users' likes)+(coefficient×the number of positive remarks). Similarly, the CPU 2 may change the points for "ill-reputed road" in "user feedback", to a value corresponding to a value calculated by the following calculation expression as given in the figure: (coefficient×the number of users' likes)+(coefficient×the number of negative remarks).

It is to be noted that examples of numerical values of the incentive points and the demerit points for each "road type" summarized in FIGS. 6A and 6B are merely examples for purposes of explanation. The incentive points and the demerit points are not limited to these numerical values.

In response to the execution of the calculation process of step S106, the CPU 2 may cause the flow to proceed to step S107.

In step S107, the CPU 2 may rearrange the proposed routes for each of the segments S, in a decreasing order of the evaluation points. That is, the CPU 2 may sort the proposed routes for each of the segments S, in a decreasing order of the number of the route evaluation points Vr.

It is to be noted that such a sorting process may be omitted.

In step S108 following step S107, the CPU 2 may connect the proposed routes having the greatest number of the route evaluation points Vr for the respective segments S, to create the course. Hereinbelow, the course created in step S108 is referred to as a "trial course".

In step S109 following step S108, the CPU 2 may determine whether or not the trial course is different from the efficiency-oriented course. That is, the CPU 2 may determine whether or not the trial course created in step S108 matches the course searched for with the use of an efficiency-oriented algorithm as the distance-oriented or necessary-time-oriented route search algorithm.

In a case with a determination that the trial course matches the efficiency-oriented course (No in step S109), the CPU 2 may cause the flow to return to step S103, to create the course again. At this occasion, in the processes of steps S103 and S104 to be executed again, the CPU 2 may allow the combination of the via-points or the sequence of passing through the via-points, or both, to be changed from the setting for the preceding course creation. This leads to creation of a different course from the efficiency-oriented course.

Meanwhile, in step S109, in a case with a determination that the trial course does not match the efficiency-oriented course (Yes in step S109), the CPU 2 may cause the flow to proceed to step S110 illustrated in FIG. 5.

FIG. 5 illustrates a processing procedure corresponding to revision of the course and setting of the proposed course.

In step S110, the CPU 2 may extract spots on the trial course. The spot as used here means a spot managed by the requisite spot DB as described above. That is, the spot as used here means the predetermined requisite spot, e.g., a point or facilities, to be included in the course.

FIG. 7 is a chart of contents of the information in the requisite spot DB.

The requisite spots may be classified into levels according to a degree of importance, or a degree of necessity. In this example, three levels from level-1 to level-3 are defined. The higher the order of the level, the higher the degree of importance.

Level-3 requisite spots may include "facilities with a parking lot nearby", "facilities having a rest room", and "a rest stop". As used here, "a rest stop" means a spot that has at least a space available for parking vehicles.

It is to be noted that the level-3 requisite spots are not limited to "facilities with a parking lot nearby", "facilities having a rest room", and "a rest stop" as exemplified above. The level-3 requisite spots may include, for example, "meal facilities" such as restaurants, and "facilities available for souvenir shopping".

Level-2 requisite spots may include, for example, "a locally well-known shop", "a shop that sells extraordinary items", "a privately managed shop", and "a shop recommended by a TV star".

Level-1 requisite spots may include, for example, "a spot with a superb view", "a theme park for, without limitation, animals, alligators, plants, or flowers", "fruit picking for, without limitation, strawberries or kiwi fruits", "a cafe", "an art gallery", "virtual experience facilities", "a footbath", "a cave", and "a cape".

It will be understood that the tendency is that the level-2 requisite spots are tourist spots known only to few, while the level-1 requisite spots are well-known tourist spots, or famous spots.

In this example, conditions of the requisite spot may be provided for each level. In one specific but non-limiting example, as to the level-1 requisite spots, the condition is that one or more is to be included in the course. As to the level-2 requisite spots, the condition is that three or more are to be included in the course.

As to level-3 requisite spots, different conditions may be provided for each spot. For example, as to "facilities with a parking lot nearby", the condition is that one or more are to be included during 2-hour travel. As to "facilities with a rest room", the condition is that one or more are to be included during 1.5-hour travel. As to "a rest spot", the condition is that one or more are to be included in each of the routes on the course.

In step S110, the CPU 2 may extract, from the trial course, the spots that correspond to the requisite spot managed by the requisite spot DB as mentioned above. In one specific but non-limiting example, the requisite spot DB in reality may hold the positional information of the spots that correspond to the requisite spot, for each of the levels from level-1 to level-3. On the basis of the positional information, the CPU 2 may extract all the requisite spots present on the trial course.

Figure 8:
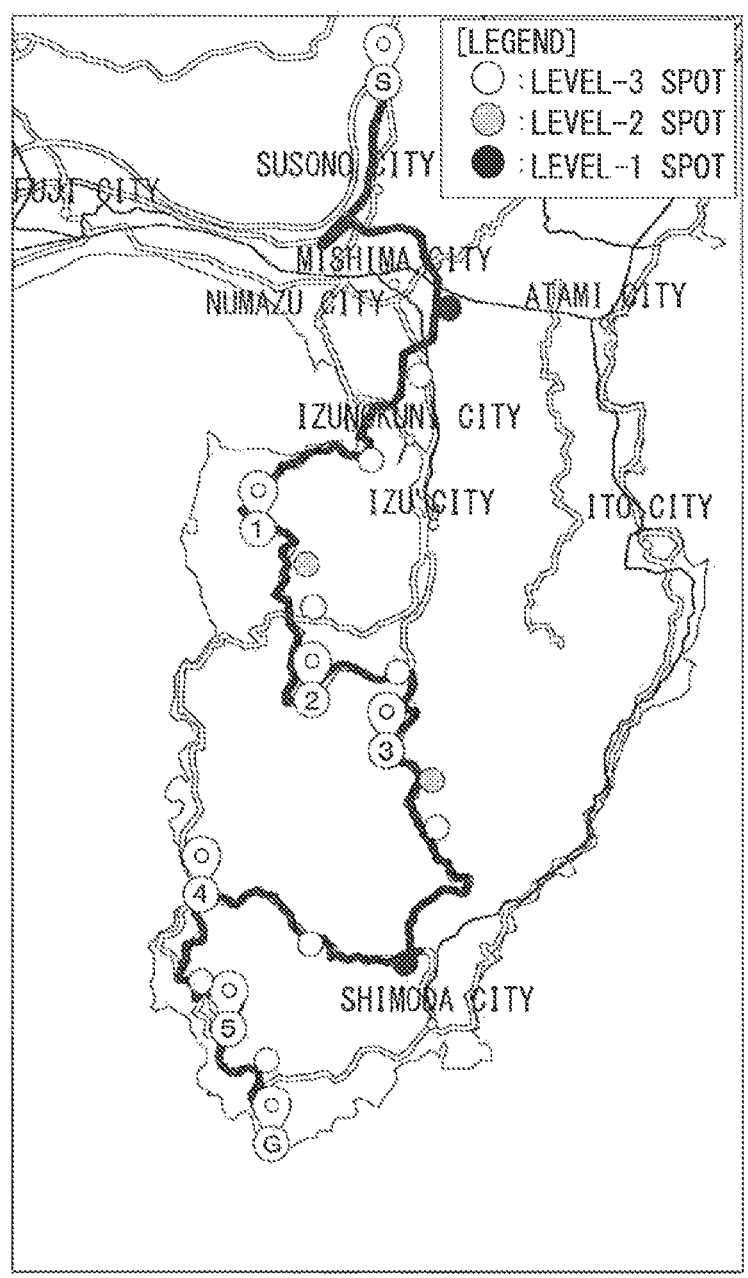
FIG. 8 is a diagram of a visualized example of extraction of a requisite spot from a course.

FIG. 8 is a diagram of a visualized example of extraction of the requisite spot from the course. In the figure, a black bold line represents a path of the course. Serially numbered white circles represent the via-points and the sequence of passing through the via-points. Color-coded circles in white, gray, and black respectively represent the level-3 requisite spots (white), the level-2 requisite spots (gray), and the level-1 requisite spots (black).

As used here, the spot present on the course does not mean strictly only the spot present on the road as the course, but may include a spot that may be regarded as present on the course. For example, the spot present on the course may include a spot located at a distance from the course within a predetermined range.

In FIG. 5, in step S110, the CPU 2 may execute the process of the extraction. In response thereto, in steps S111, S112, and S113, the CPU 2 may make determination as to the condition of each of the level-3 requisite spots. In one specific but non-limiting example, in step S111, the CPU 2 may determine whether or not one or more "facilities with a parking lot nearby" are included during 2-hour travel. In step S112, the CPU 2 may determine whether or not one or more "facilities with a rest room" are included during 1.5-hour travel. In step S113, the CPU 2 may determine whether or not one or more "rest stops" are included in each of the routes on the course.

After executing the processes of steps S111 to S113, the CPU 2 may determine, in step S114, whether or not the conditions of the level-3 requisite spots are all satisfied. That is, the CPU 2 may determine whether or not positive results have been obtained in the determination processes of steps S111 to S113.

As described above, in step S111, the CPU 2 may determine whether or not one or more "facilities with a parking lot nearby" are included during 2-hour travel. In step S112, the CPU 2 may determine whether or not one or more "facilities having a rest room" are included during 1.5-hour travel. Moreover, in the process of step S111, the CPU 2 may determine whether or not the condition as described above is satisfied, in a case where the necessary time for the trial course is equal to or longer than 2 hours. In the process of step S112, the CPU 2 may determine whether or not the condition as described above is satisfied, in a case where the necessary time for the trial course is equal to or longer than 1.5 hours. The necessary time for the trial course may be necessary time for travel from the starting point to the destination point. Specifically, in this example, in step S111, in a case where the necessary time is shorter than 2 hours, the CPU 2 may compulsively obtain a determination result that one or more "facilities with a parking lot nearby" are included during 2-hour travel. In step S112, in a case where the necessary time is shorter than 1.5 hours, the CPU 2 may compulsively obtain a determination result that one or more "facilities with a rest room" are included during 1.5-hour travel. In step S111, the CPU 2 may determine whether or not one or more "facilities with a parking lot nearby" are included during 2-hour travel, solely in a case where the necessary time is equal to or longer than 2 hours. In step S112, the CPU 2 may determine whether or not one or more "facilities having a rest room" are included during 1.5-hour travel, solely in a case where the necessary time is equal to or longer than 1.5 hours.

As described, in this example, with regard to "facilities with a parking lot nearby" and "facilities having a rest room" out of the level-3 requisite spots, the CPU 2 may be allowed to determine whether or not the requisite spots are included in the course, on the condition that the necessary time for the course is equal to or longer than predetermined time.

In particular, with respect to facilities such as a rest room, setting of such facilities may be considered to be unnecessary, if the necessary time ranges within a certain period of time. Accordingly, with respect to such spots, the CPU 2 may refrain from determining whether or not such spots are included in the course, in the case where the necessary time for the course is short. Hence, it is possible to prevent the conditions imposed on the course from becoming excessive, leading to appropriate course setting.

In step S114, in a case with a negative result that the conditions of the level-3 requisite spots are not all satisfied (No in step S114), the CPU 2 may cause the flow to proceed to step S115, to revise the course to satisfy the conditions. In other words, the CPU 2 may revise the course, for whichever requisite spot does not satisfy the condition, out of "facilities with a parking lot nearby", "facilities having a rest room", and "rest spot", to satisfy the condition. At this occasion, there may be cases with presence of a plurality of proposed requisite spots to satisfy the condition. In such cases, for example, the CPU 2 may select, from among the proposed requisite spots, whichever has a minimum spacing distance from the course before revision. This makes it possible to suppress deformation of the course caused by the revision.

Thus, in step S115, the CPU 2 may revise the course. In response thereto, in step S116, the CPU 2 may extract spots on the revised course. That is, for the revised course, the CPU 2 may perform a similar process to that of previous step S110, to extract the spots on the course. This process is a process in consideration of possibility that new requisite spots of level-2 or lower are included in the revised course. Refer to processes of steps S117 and S120 described later.

In response to the execution of the process of step S116, the CPU 2 may cause the flow to proceed to step S117.

In previous step S114, in a case with a positive result that the conditions of the level-3 requisite spots are all satisfied (Yes in step S114), the CPU 2 may omit the processes of steps S115 and S116, and cause the flow to proceed to step S117.

In step S117, the CPU 2 may determine whether or not three or more level-2 requisite spots are included. In other words, the CPU 2 may determine whether or not three or more level-2 requisite spots are included in the course as a target of the determination regarding the conditions, e.g., the trial course created in step S108 or the revised course in step S115.

In step S117, in a case with a negative result that the course fails to contain more than three level-2 requisite spots (No in step S117), the CPU 2 may cause the flow to proceed to step S118, to revise the course to satisfy the conditions. It is to be noted that the revision process of step S118 may be also carried out to suppress the deformation of the course caused by the revision, as with the case of previous step S115. Thus, in step S118, the CPU 2 may revise the course. In response thereto, in step S119, the CPU 2 may extract spots on the revised course and cause the flow to proceed to step S120.

Meanwhile, in step S117, in a case with a positive result that three or more level-2 requisite spots are included (Yes in step S117), the CPU 2 may omit the processes of steps S118 and S119, and cause the flow to proceed to step S120.

In step S120, the CPU 2 may determine whether or not one or more level-1 requisite spots are included. In a case with a negative result (No in step S120), the CPU 2 may revise the course, in step S121, to satisfy the condition. Thereafter, the CPU 2 may cause the flow to proceed to step S122. Meanwhile, in step S120, in a case with a positive result (Yes in step S120), the CPU 2 may omit the process of step S121 and cause the flow to proceed to step S122.

In step S122, the CPU 2 may calculate the course evaluation points Vc. In this example, the CPU 2 may calculate, as the course evaluation points Vc, the total value of the route evaluation points Vr of the proposed routes that constitute the course. Accordingly, in step S122, the CPU 2 may calculate the route evaluation points Vr for each of the proposed routes that constitute the course, on the basis of the information in the evaluation information DB as mentioned above, and thereafter, calculate the total value of the route evaluation points Vr as the course evaluation points Vc.

Calculating the course evaluation points Vc at this timing of step S122 makes it possible to calculate the course evaluation points Vc for the revised course in the case where the course revision process is performed in step S115, S118, or S121.

In step S123 following step S122, the CPU 2 may determine whether or not the number of the course evaluation points Vc is equal to or greater than the threshold TH. In a case where the number of the course evaluation points Vc is smaller than the threshold TH (No in step S123), the CPU 2 may cause the flow to return to step S103 illustrated in FIG. 4, to create the course again. This may be also referred to as the revision of the trial course.

Providing the process of step S123 makes it possible to revise the course in the case where the number of the course evaluation points Vc is smaller than a predetermined reference value. The course evaluation points Vc may serve as evaluation points in terms of the capability to give great travel experience such as the joy of travel and fine scenery.

Meanwhile, in step S123, in a case with a determination that the number of the course evaluation points Vc is equal to or greater than the threshold TH (Yes in step S123), the CPU 2 may cause the flow to proceed to step S124, to set the trial course as the proposed course Cc for the route guidance. Thus, the CPU 2 may terminate the series of processes illustrated in FIGS. 4 and 5.

The CPU 2 may provide display of information representing the proposed course Cc thus set, on the screen of the display unit 7, as processing to be executed by the course setting unit 28 as described above. In this way, the CPU 2 may allow the user to confirm the contents of the course.

FIG. 9 is a diagram of an example of a confirmation display screen G1. The confirmation display screen G1 is provided for the user's confirmation of the contents of the proposed course Cc.

As illustrated in the figure, the confirmation display screen G1 may include a map display region Am. The map display region Am is provided for display of the map information. The information representing the proposed course Cc may be displayed on a map in the map display region Am. In one specific but non-limiting example, in the map display region Am, information regarding a path of the proposed course Cc, the starting point, the destination point, and serially numbered pin marks may be displayed. The information regarding the path of the proposed course Cc may be represented by a black bold line in the figure. The starting point may be denoted by a character of "S". The destination point may be denoted by a character of "G". The serially numbered pin marks may represent the via-points and the sequence of passing through the via-points. In the example illustrated in the figure, out of the via-points, the via-points as the nice-moment places are represented by shaded pin marks.

In the confirmation display screen G1, distance information I1 and necessary time information I2 may be displayed. The distance information I1 may indicate a distance of the proposed course Cc, i.e., a distance of the path from the starting point to the destination point through the via-points. The necessary time information I2 may indicate the necessary time for the proposed course Cc, i.e., necessary time for travel from the starting point to the destination point through the via-points. In this example, as the distance information I1, a difference value between the distance of the proposed course Cc and a distance of the efficiency-oriented course may be displayed in parentheses. Similarly, as the necessary time information I2, a difference value between the necessary time for the proposed course Cc and necessary time for the efficiency-oriented course may be displayed in parentheses.

Furthermore, in the confirmation display screen G1, a decide button B1 may be displayed as a GUI that allows for an input of an instruction to set the proposed course Cc as the course for the route guidance. In response to detection of an operation on the decide button B1, the CPU 2 may set the proposed course Cc as the course for the route guidance, i.e., the guidance course Cg.

2. Second Embodiment (2-1. CPU in Second Embodiment)

In the first embodiment, given is an example where the course is created to allow the number of the course evaluation points Vc to become as great as possible. In one specific but non-limiting example, in the first embodiment, the proposed routes having the greatest number of the route evaluation points Vr for each of the segments S may be connected to create the trial course. This makes it possible to create the course to allow the number of the course evaluation points Vc to become as great as possible.

A second embodiment of the technology may include allowing the user to make selection as to how many evaluation points the course to be created has.

As described above, the route evaluation points Vr and the course evaluation points Vc in this example are the evaluation points from the viewpoint of the capability to give the user the great travel experience such as the fully appreciation of the joy and the pleasure of travel, the fully appreciation of the kinematic performance of the vehicle, and the evocation of the sense of adventure. Hereinafter, an evaluation index from such a viewpoint is referred to as a "discovery gain". The greater value the discovery gain takes, the greater the capability to give the user, for example, the joy and the pleasure of travel and the sense of adventure.

Figure 10:
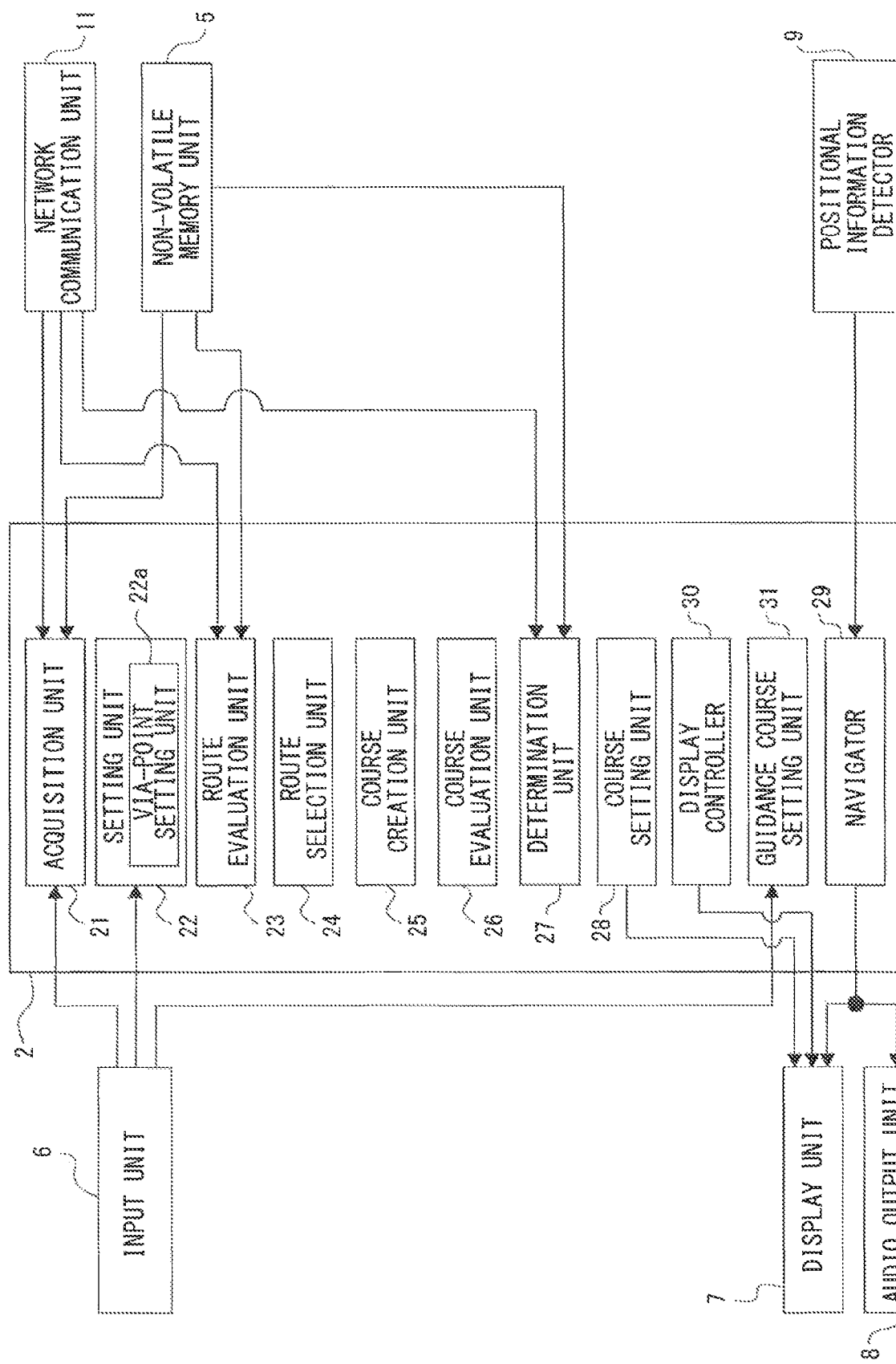
FIG. 10 is a block diagram of a CPU of the information processor according to a second embodiment.

FIG. 10 is a block diagram of the CPU 2 of the information processor 1.

It is to be noted that in the second embodiment, a hardware configuration of the information processor 1 is similar to that illustrated in FIG. 2, and therefore, redundant description is avoided. In the following description, similar parts to those already described are denoted by the same reference characters or the same step numerals, and description thereof is omitted.

In this case, the CPU 2 may further include a display controller 30 and a guidance course setting unit 31, in addition to the subunits such as the acquisition unit 21 to the navigator 29 illustrated in FIG. 3.

Figure 11:
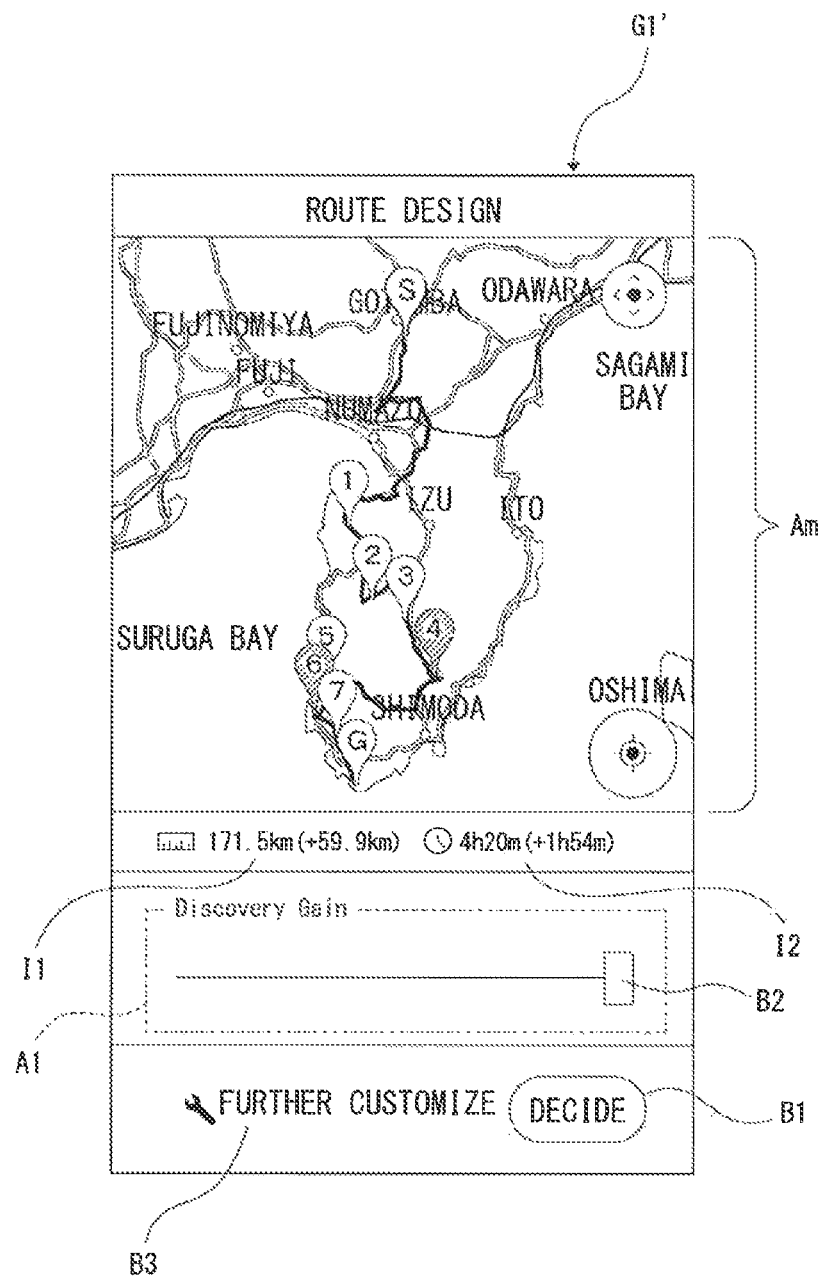
FIG. 11 is a diagram of an example of a confirmation display screen according to the second embodiment.

The display controller 30 may cause the course and an indicator of the course evaluation points Vc to be displayed on the same screen. In one specific but non-limiting example, the display controller 30 according to this example may provide display of a confirmation display screen G1' as illustrated in FIG. 11 on the display unit 7, in response to the setting of the proposed course Cc. The proposed course Cc may be created to allow the number of the course evaluation points Vc to become as great as possible by the processing illustrated in FIGS. 4 and 5.

The confirmation display screen G1' illustrated in FIG. 11 is different from the confirmation display screen G1 illustrated in FIG. 9 in that the confirmation display screen G1' may include a gain display region A1. In the gain display region A1, an indicator of the discovery gain may be displayed. The indicator of the discovery gain may be also referred to as an indicator of the course evaluation points Vc.

In this example, in the gain display region A1, a GUI that allows the user to designate the discovery gain may be displayed as the indicator of the discovery gain. In one specific but non-limiting example, a GUI in a form of, for example, a slide bar may be displayed as the GUI in this example. The GUI in the form of the slide bar may make it possible to designate magnitude of the discovery gain by a position of a slide bar B2.

In this case, the discovery gain may be indicated by the slide bar B2 on the confirmation display screen G1'. In response to an operation to change the discovery gain with the use of the slide bar B2, the course creation unit 25 may generate a course corresponding to a post-change value of the discovery gain. In the case with the operation to change the discovery gain, the display controller 30 may perform a display control of switching a course to be displayed on the confirmation display screen G1' from the course corresponding to a pre-change value of the discovery gain to the course corresponding to the post-change value of the discovery gain.

FIGS. 12A to 12C are diagrams of examples of screen transitions of the confirmation display screen G1', with the discovery gain changed.

In this example, the value of the discovery gain may be variable in four levels from zero (0) to 3. In the case where the course creation is performed to allow the number of the course evaluation points Vc to become as great as possible by the processing illustrated in FIGS. 4 and 5, the value of the discovery gain may take the greatest value "3". Refer to FIG. 11. FIG. 12A illustrates an example of the screen transition from a state of FIG. 11 to a state with the value of the discovery gain changed to "2". FIG. 12B illustrates an example of the screen transition in response to the change in the value of the discovery gain from "2" to "1". FIG. 12C illustrates an example of the screen transition in response to the change in the value of the discovery gain from "1" to "0". In the case where the discovery gain equals to 0 (=0), the efficiency-oriented course as described above may be created. Accordingly, on the confirmation display screen G1' in FIG. 12C, the value in the parentheses with respect to the distance information I1 is "+0.0 km", and the value in the parentheses with respect to the necessary time information I2 is "+0 m".

Referring to FIG. 10 again, the guidance course setting unit 31 may set the course displayed on the confirmation display screen G1' as the course for the route guidance, on the basis of the user's operation. In one specific but non-limiting example, the guidance course setting unit 31 may set the course displayed in the map display region Am as the guidance course Cg, in accordance with the operation on the decide buttons B1 provided on the confirmation display screen G1'.

The confirmation display screen G1' in this example may further include a customize button B3. The customize button B3 may allow the user to make an operation to perform course customization such as a change in the via-point on the course, which is described later.

In the forgoing description, the GUI in the form of the slide bar is given as an example of the GUI to be displayed as the indicator of the discovery gain. In one alternative, a GUI in another form such as a dial form and a meter form may be adopted as the GUI to be displayed as the indicator of the discovery gain.

(2-2. Processing Procedure)

Figure 13:
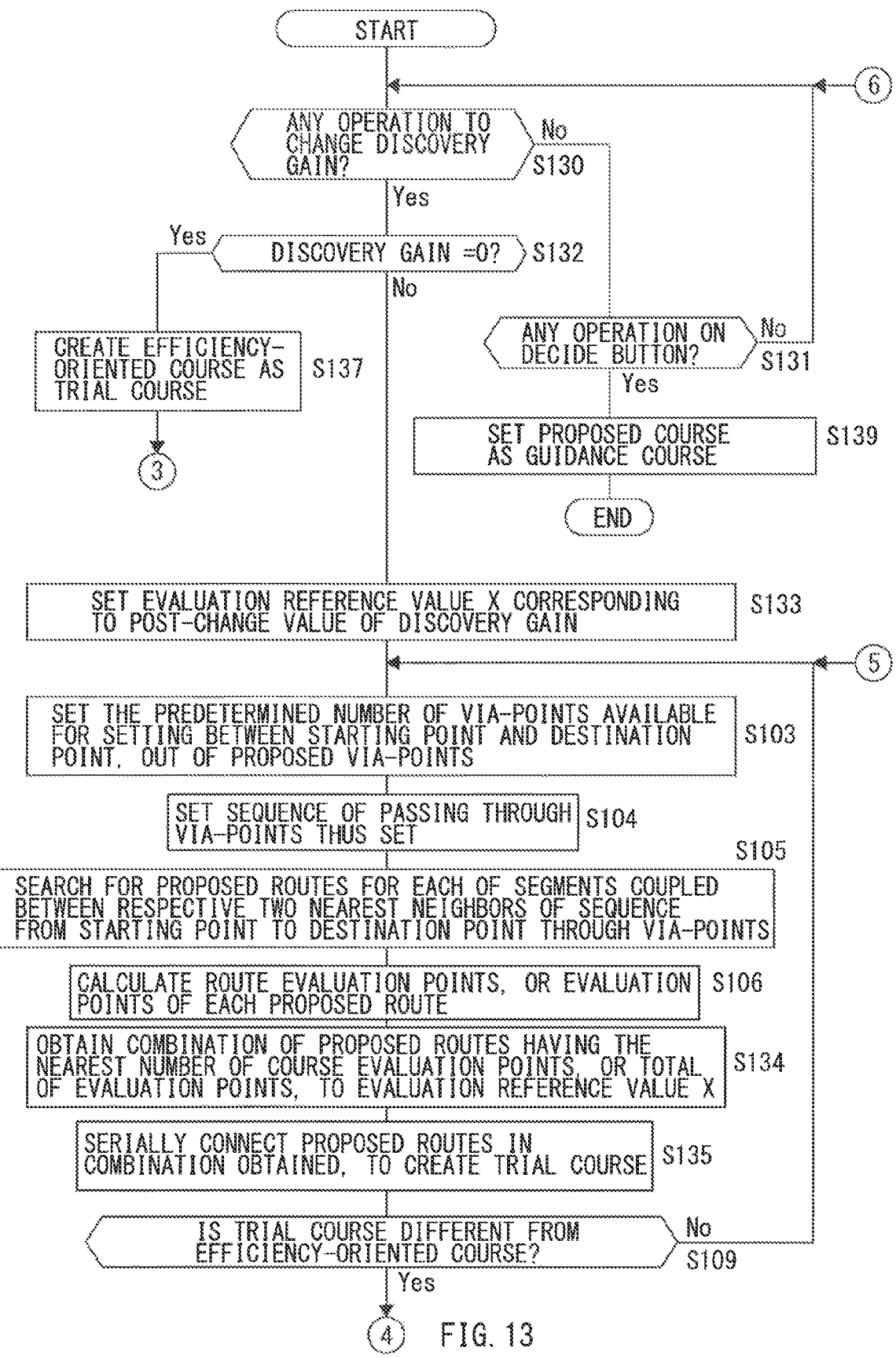
FIG. 13 is a flowchart illustrating a specific example of a procedure of processing to be executed by the CPU according to the second embodiment.
Figure 14:
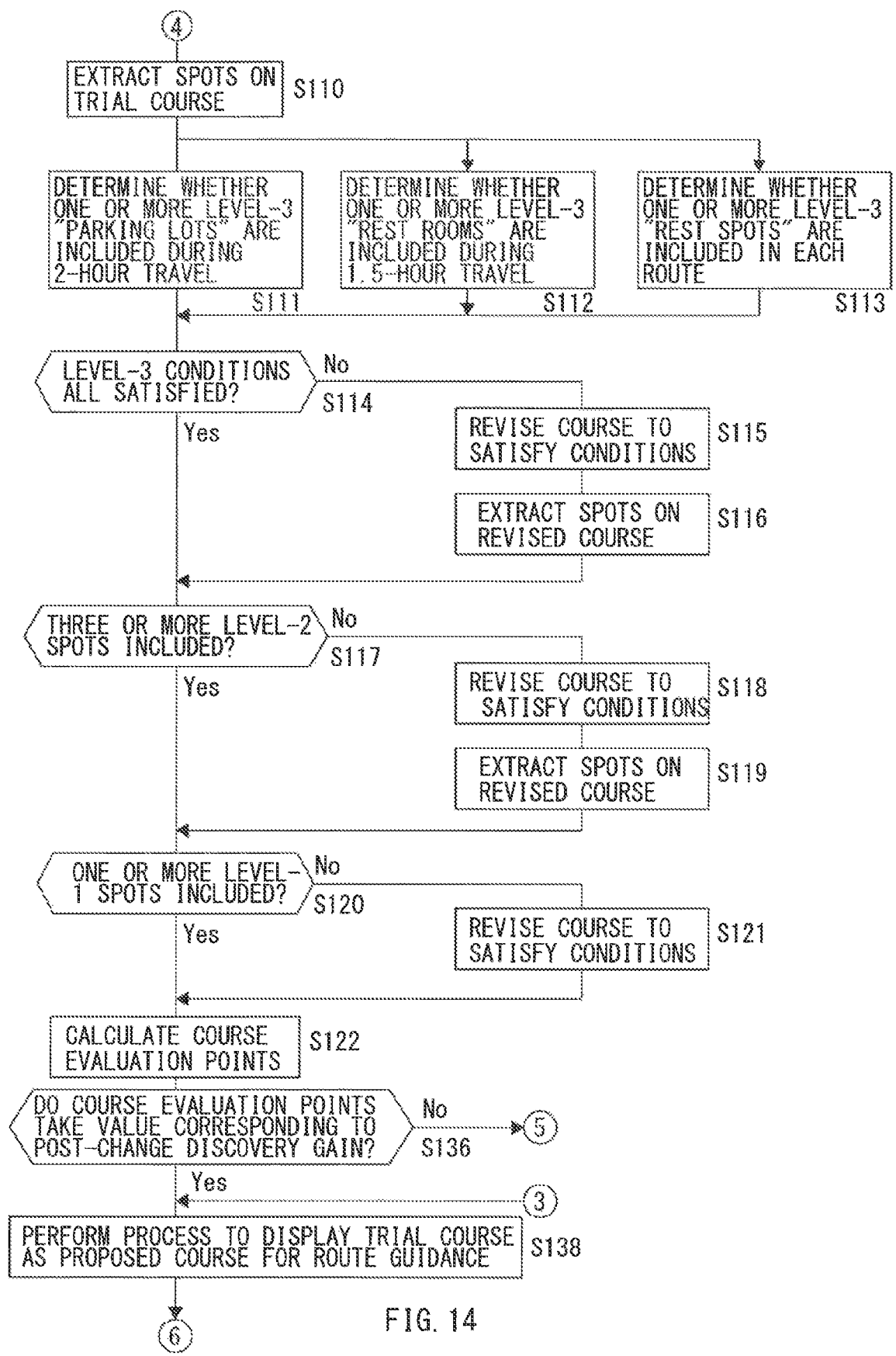
FIG. 14 is a flowchart illustrating, together with FIG. 13, the specific example of the procedure of the processing to be executed by the CPU according to the second embodiment.

With reference to flowcharts in FIGS. 13 and 14, description is given of a specific processing procedure to be executed by the CPU 2, or by the subunits of the CPU 2 according to the second embodiment as described.

FIG. 13 illustrates a procedure corresponding to processing before the creation of the course corresponding to the value of the discovery gain. FIG. 14 illustrates a processing procedure corresponding to the revision of the course, the setting of the proposed course Cc, and the setting of the guidance course Cg. The series of the processing illustrated in FIGS. 13 and 14 may be started in response to the processing illustrated in FIGS. 4 and 5 being executed and the confirmation display screen G1' being displayed on the display unit 7. The confirmation display screen G1' may provide the display of the proposed course Cc, with the discovery gain being equal to 3 (=3).

First, in steps S130 and S131, the CPU 2 may be on standby for either an operation of changing the discovery gain or an operation on the decide button B1. In step S131, in a case with a determination of presence of the operation on the decide button B1 (Yes in step S131), the CPU 2 may cause the flow to proceed to step S139, to perform the process of setting the proposed course Cc as the guidance course Cg. That is, the CPU 2 may set the proposed course Cc on display on the confirmation display screen G1' as the guidance course Cg.

Meanwhile, in step S130, in a case with a determination of presence of the operation of changing the discovery gain (Yes in step S130), the CPU 2 may cause the flow to proceed to step S132, to determine whether or not the discovery gain is equal to zero (=0). That is, the CPU 2 may determine whether or not the discovery gain designated by the operation of changing the discovery gain is equal to zero (0). In a case with the discovery gain being zero (=0) (Yes in step S132), the CPU 2 may cause the flow to proceed to step S137, to create the efficiency-oriented course as the trial course. Thereafter, the CPU 2 may cause the flow to proceed to step S138 illustrated in FIG. 14, to perform processing to provide display of the trial course as the proposed course Cc for the route guidance. In other words, the CPU 2 may perform the processing to provide, on the display unit 7, the display of the confirmation display screen G1' in which the trial course is displayed as the proposed course Cc in the map display region Am.

In this way, in the case with the discovery gain changed to zero (=0), the proposed course Cc to be displayed on the confirmation display screen G1' is switched to the efficiency-oriented course. Refer to FIG. 12C.

Meanwhile, in step S132, in a case where the discovery gain is not equal to zero (0) (No in step S132), the CPU 2 may cause the flow to proceed to step S133, to set an evaluation reference value X. The evaluation reference value X may correspond to the post-change value of the discovery gain. This corresponds to processing of converting the value of the discovery gain into the number of the course evaluation points Vc. In this example, the evaluation reference values X corresponding to the respective values "3", "2", and "1" of the discovery gain may be predetermined. In step S133, the CPU 2 may set whichever value of the predetermined evaluation reference values X corresponds to the post-change value of the discovery gain.

In response to the execution of the process of step S133, the CPU 2 may execute the processes of steps S103 to S106 described in the first embodiment, to calculate the evaluation points for each of the proposed routes in each of the segments S, i.e., the route evaluation points Vr.

Thereafter, in response to the execution of the calculation process of step S106, the CPU 2 may execute, in step S134, a process of obtaining a combination of the proposed routes having the nearest number of the course evaluation points Vc, or a total value of the evaluation points, to the evaluation reference value X. In other words, the CPU 2 may obtain, as the combination of the proposed routes for the respective segments S from the starting point to the destination point, a combination having the nearest total value of the route evaluation points Vr to the evaluation reference value X.

In step S135 following step S134, the CPU 2 may serially connect the proposed routes in the obtained combination, to create the trial course. Thereafter, in subsequent step S109, the CPU 2 may determine whether or not the trial course is different from the efficiency-oriented course. In a case where the trial course matches the efficiency-oriented course (No in step S109), the CPU 2 may cause the flow to return to step S103. This leads to the creation of the course different from the efficiency-oriented course.

Meanwhile, in the case where the trial course is different from the efficiency-oriented course (Yes in step S109), the CPU 2 may execute the processes of steps S110 to S122 illustrated in FIG. 14, to determine whether or not the conditions of the requisite spots are satisfied, to revise the course in the case where the conditions are not satisfied, and to calculate the course evaluation points Vc with respect to the course that satisfies the conditions. It is to be noted that the contents of the processes from step S110 to step S122 are described in the forgoing, and redundant description is avoided.

In step S136 following step S122, the CPU 2 may determine whether or not the number of the course evaluation points Vc takes a value corresponding to the post-change discovery gain. That is, the CPU 2 may determine whether or not the number of the course evaluation points Vc takes a value corresponding to the evaluation reference value X set in step S133. In one specific but non-limiting example, the CPU 2 may determine whether or not a difference value, or an absolute value of the difference value, between the number of the course evaluation points Vc and the evaluation reference value X is equal to or smaller than a predetermined value.

In a case where the number of the course evaluation points Vc fails to take the value corresponding to the post-change discovery gain (No in step S136), the CPU 2 may cause the flow to return to step S103. This makes it possible to perform the course creation again from the setting of the via-points, in the case where the number of the course evaluation points Vc deviates from the value corresponding to the post-change discovery gain because of the revision process of step S115, S118, or S121.

Meanwhile, in a case where the number of the course evaluation points Vc takes the value corresponding to the post-change discovery gain (Yes in step S136), the CPU 2 may cause the flow to proceed to step S138, to perform processing to provide the display of the trial course as the proposed course Cc for the route guidance. Thus, in the confirmation display screen G1', the proposed course Cc is displayed that corresponds to the value of the post-change discovery gain and satisfies the conditions of the requisite spots.

In response to the execution of the process of step S138, the CPU 2 may cause the flow to return to step S130 illustrated in FIG. 13, to be on standby again for either the operation of changing the discovery gain or the operation on the decide button B1. In the case with the presence of the operation of changing the discovery gain (Yes in step S130), the CPU 2 may execute the processes of steps S132 to S138, to switch the course to be displayed on the confirmation display screen G1' from the proposed course Cc corresponding to the pre-change value of the discovery gain to the proposed course Cc corresponding to the post-change value of the discovery gain. Meanwhile, in the case with the presence of the operation on the decide button B1 (Yes in step S131) the CPU 2 may execute the process of step S139, to set the proposed course Cc on display on the confirmation display screen G1' as the guidance course Cg.

In response to the execution of the process of step S139, the CPU 2 may terminate the series of processing illustrated in FIGS. 13 and 14.

It is to be noted that in the forgoing, given is an example where the efficiency-oriented course is created, in the case where the discovery gain is equal to zero (=0). In one alternative, even in the case where the discovery gain is equal to zero (=0), a course may be created on the basis of the number of the course evaluation points Vc corresponding to the discovery gain, as with the case where the discovery gain takes other values.

Moreover, in the forgoing, given is an example where no condition of the requisite spot is imposed, in the case where the discovery gain is equal to zero (=0), or takes a minimum value (steps S132, S137, and S138). In this case as well, the CPU 2 may execute the process of steps S110 to S136, with the condition of the requisite spot imposed.

(2-3. Regarding Via-Point Customization)

Figure 12:
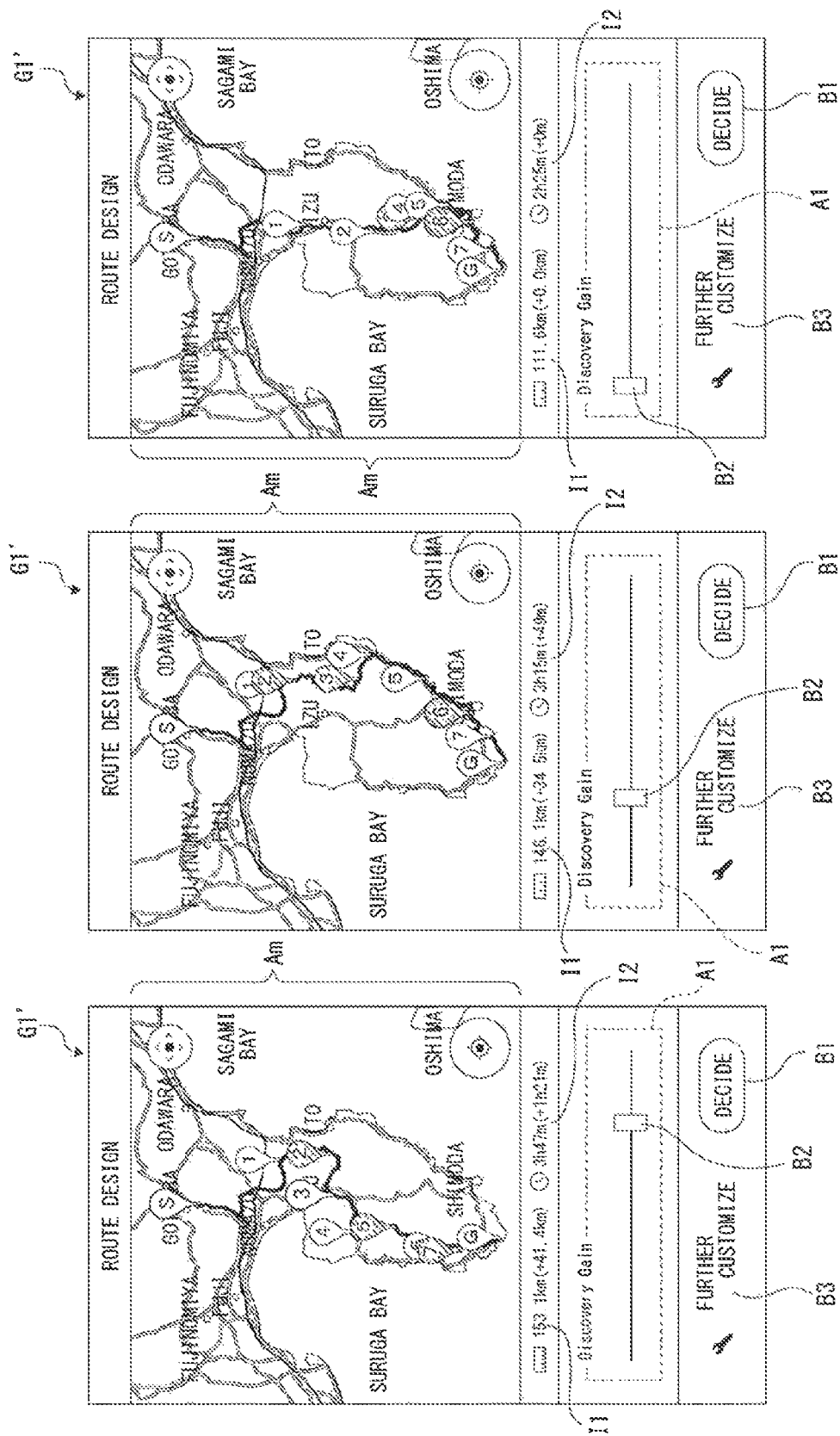
FIGS. 12A to 12C are diagrams of examples of screen transitions of the confirmation display screen, with a discovery gain changed.

In this example, the operation on the customize button B3 as illustrated in FIGS. 11 and 12 makes it possible to customize the via-points on the proposed course Cc.

With reference to FIGS. 15A and 15B, and 16A to 16C, description is given of examples of screen transitions regarding via-point customization.

Figure 15:
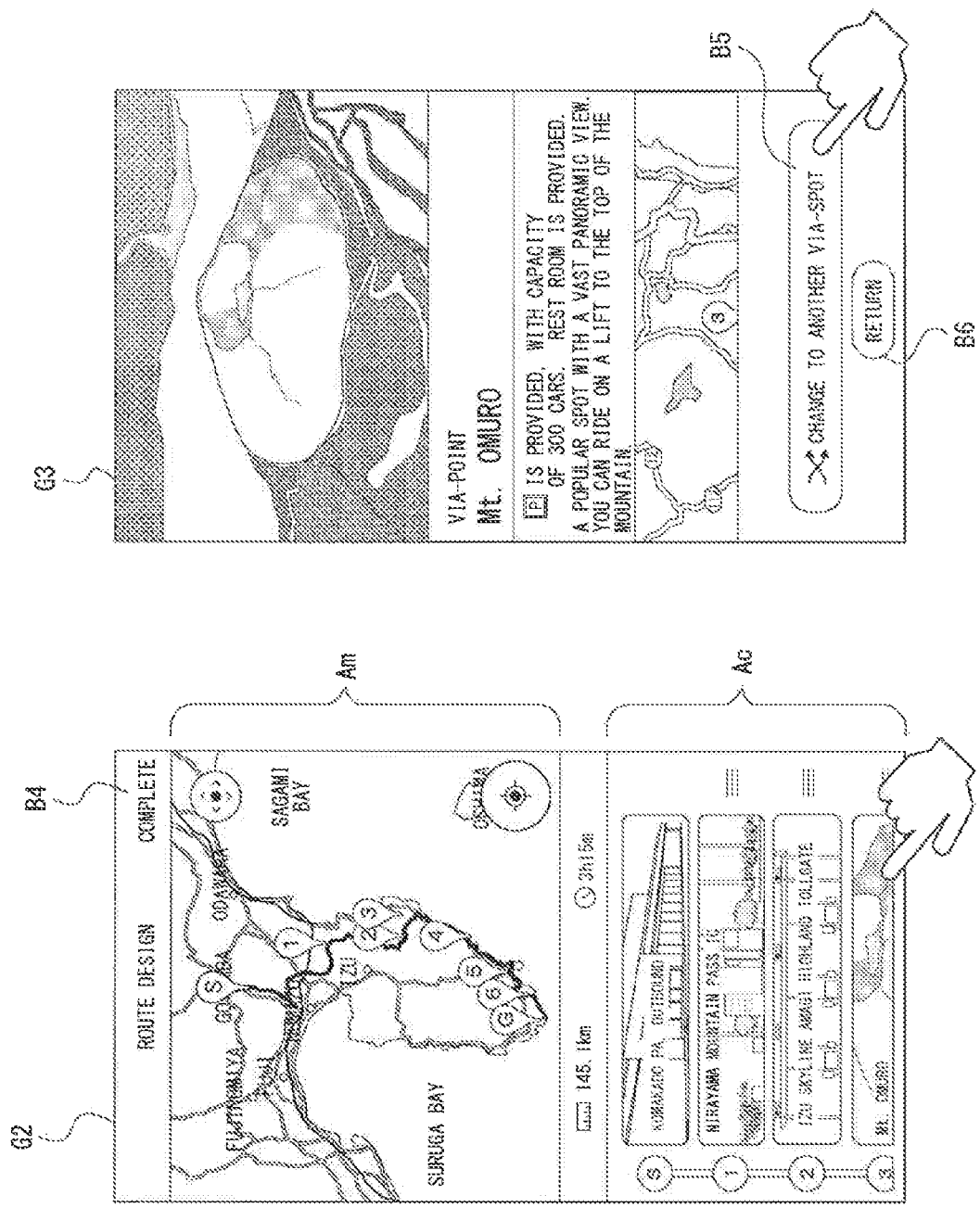
FIGS. 15A and 15B are diagrams of examples of screen transitions regarding via-point customization.

FIG. 15A illustrates an example of a via-point list screen G2. The via-point list screen G2 may be displayed on the display unit 7 in response to the operation on the customize button B3 on the confirmation display screen G1'.

As illustrated in the figure, the via-point list screen G2 may include a via-point display region Ac, together with the map display region Am. The map display region Am may provide the display of the proposed course Cc. The via-point display region Ac may provide list display of the via-points on the proposed course Cc. If the user is interested in changing any one of the via-points on the proposed course Cc, the via-point list screen G2 may allow the user to make an operation, e.g., a touching operation, to select the relevant via-point from the via-points displayed in the via-point display region Ac. In the figure, an example case is illustrated where the operation of selecting the third via-point, "Mt. Omuro" has been made.

The via-point list screen G2 may include a complete button B4, allowing the user to make an operation to give an instruction to complete the via-point customization to the information processor 1, or the CPU 2. In a case with the operation on the complete button B4, the screen display of the display unit 7 is restored to the display of the confirmation display screen G1'.

Upon the selection of the via-point from the list in the via-point display region Ac, the display unit 7 may provide display of a via-point detail screen G3 as illustrated in FIG. 15B. In the via-point detail screen G3, detailed information regarding the via-point selected may be displayed, e.g., a name and an image of the via-point, presence or absence of a parking lot, presence or absence of a rest room, and the positional information on the map. The via-point detail screen G3 may further include a change instruction button B5 and a return button B6.

In a case where the user is interested in making a change from the via-point the detailed information of which is displayed in the via-point detail screen G3, i.e., the via-point selected by the user themselves on the via-point list screen G2, to another via-point, the change instruction button B5 may allow the user to make an operation to make such a change. Moreover, in a case where the user is interested in checking details of another via-point, the return button B6 may allow the user to make an operation to return to the via-point list screen G2 illustrated in FIG. 15A.

Figure 16:
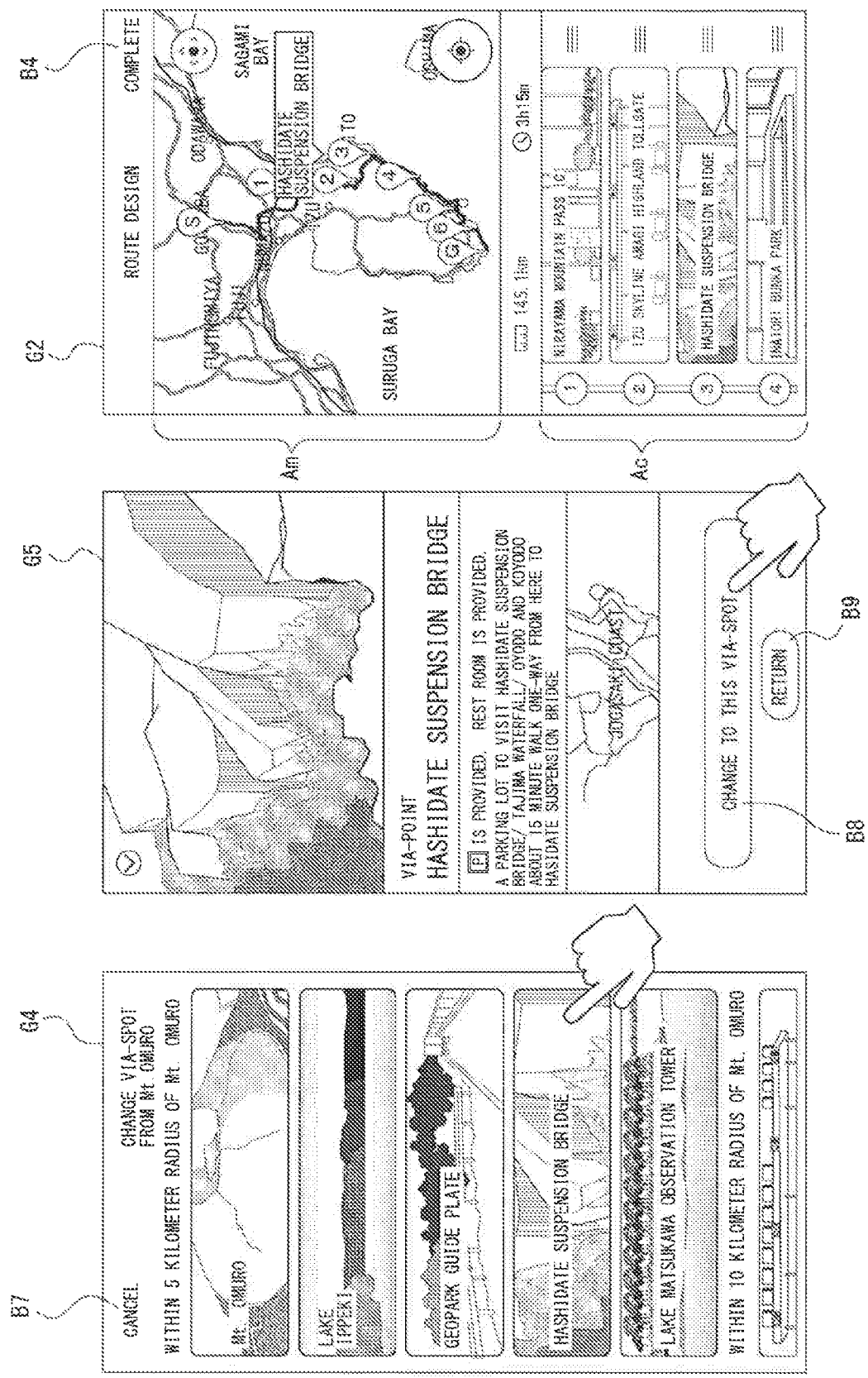
FIGS. 16A to 16C are diagrams illustrating, together with FIGS. 15A and 15B, examples of the screen transitions regarding the via-point customization.

FIG. 16A illustrates an example of a via-point selection screen G4. The via-point selection screen G4 may be displayed on the display unit 7 in response to the operation on the change instruction button B5.

The via-point selection screen G4 may provide list display of the via-points available for a change. In the via-point selection screen G4 in this example, the via-points available for the change may be offered in the form of the list display sorted in accordance with a spacing distance from the pre-change via-point, i.e., the via-point subject to the instruction to change to another via-point. Specifically, in this example, the list display of the via-points available for the change may be provided, for example, in the following order: the via-points within 5 kilometer radius of the pre-change via-point, and the via-points within 10 kilometer radius of the pre-change via-point.

The via-point selection screen G4 may further include a cancel button B7. The cancel button B7 may allow the user to make an operation to restore the screen display of the display unit 7 to the via-point detail screen G3.

In a case where the user is interested in changing any one of the listed via-points, the via-point selection screen G4 may allow the user to make an operation to select the relevant via-point. In the figure, an example is illustrated where the via-point "Hashidate Suspension Bridge" has been selected.

FIG. 16B illustrates an example of a change confirmation screen G5. The change confirmation screen G5 may be displayed on the display unit 7 in response to the selection of the via-point on the via-point selection screen G4.

In the change confirmation screen G5, detailed information of the via-point selected on the via-point selection screen G4 may be displayed. The change confirmation screen G5 may include a change setting button B8 and a return button B9. The change confirmation screen G5 may allow the user to make an operation on the change setting button B8 to give the CPU 2 of the information processor 1 an instruction to make a change from the via-point "Mt. Omuro" to the via-point "Hashidate Suspension Bridge". The instruction to make the change from the via-point "Mt. Omuro" is given with the use of the change instruction button B5 of the via-point detail screen G3 illustrated in FIG. 15B. The detailed information of the via-point "Hashidate Suspension Bridge" is displayed on the change confirmation screen G5.

In a case where the user is interested in selecting again the via-point to which the change is to be made, the change confirmation screen G5 may allow the user to make an operation on the return button B9 to restore the screen display of the display unit 7 to the via-point selection screen G4.

In response to the operation on the change setting button B8 on the change confirmation screen G5, the CPU 2 may create a course on which the relevant via-point on the proposed course Cc is changed to the designated via-point. In this case, the CPU 2 may create a course on which the third via-point is changed to "Hashidate Suspension Bridge". In response to the creation of the course with the change in the via-point, the CPU 2 may perform a control of allowing the display unit 7 to provide the display of the via-point list screen G2, with the created course displayed in the map display region Am.

FIG. 16C illustrates an example of the via-point list screen G2 that provides the display of the course after the change in the via-point as described above. In this case, in the via-point display region Ac, the third via-point is changed from "Mt. Omuro" to "Hashidate Suspension Bridge". That is, the contents of the display in the via-point display region Ac is also updated to the contents corresponding to the change in the via-point.

As described above, the via-point list screen G2 may include the complete button B4. In a case with an operation on the complete button B4, the screen display of the display unit 7 may be restored to the display of the confirmation display screen G1'. Hence, after the change in the via-point, it is possible for the user to make the operation on the decide button B1 on the confirmation display screen G1', to give the CPU 2 an instruction to set the course after the change in the via-point as the guidance course Cg.

It is to be noted that, as to the course on which the via-point has been changed by the customization as described above, the course evaluation points Vc may be calculated, and the course may be revised in accordance with the calculated course evaluation points Vc. In one specific but non-limiting example, in a case where the number of the calculated course evaluation points Vc is smaller than a predetermined reference value, the course may be revised to satisfy the reference value. The reference value may be, for example, the value of the discovery gain designated.

Moreover, in a case where the course on which the via-point has been changed fails to satisfy the condition of the requisite spot, the course may be revised to satisfy the condition.

(2-4. Modification Examples of Second Embodiment)

In the forgoing description, as an example of creating and displaying the proposed course Cc corresponding to the designated discovery gain, the following example is given. First, the processing illustrated in FIGS. 4 and 5 may be executed to create and display the proposed course Cc corresponding to the discovery gain being equal to 3 (=3), i.e., a maximum value. Thereafter, in response to the operation of designating the discovery gain with the use of the slide bar B2, the proposed course Cc corresponding to the designated discovery gain. However, the example of creating and displaying the proposed course Cc corresponding to the designated discovery gain is not limited thereto.

An example flow may be as follows. First, in response to an input of necessary information for the course creation, e.g., the information regarding the starting point and the destination point, the display unit 7 may be allowed to display a GUI for the operation of designating the discovery gain, e.g., the slide bar B2. Thereafter, in response to the operation of designating the discovery gain on the screen on which such a GUI is displayed, the proposed course Cc corresponding to the designated discovery gain may be created and displayed. That is, the processing illustrated in FIGS. 13 and 14 may be performed. At this occasion, in displaying the proposed course Cc corresponding to the designated discovery gain, a GUI for the operation of designating the discovery gain, e.g., the slide bar B2, may be displayed on the same screen. The GUI for the operation of designating the discovery gain is also referred to as the indicator of the discovery gain. In a case where the operation of changing the discovery gain is made, the proposed course Cc corresponding to the post-change discovery gain may be created and displayed.

Figure 17:
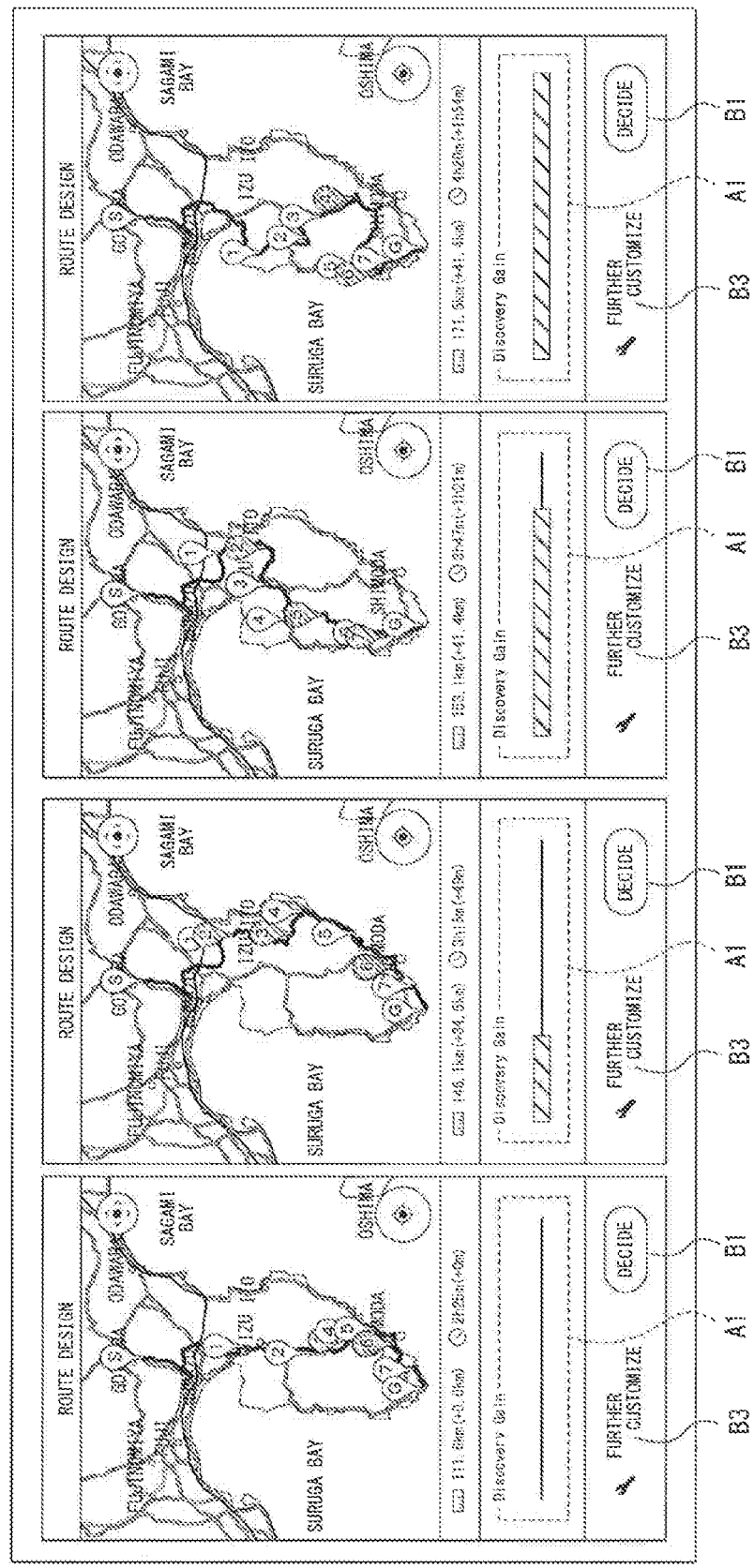
FIG. 17 is a diagram of an example of selection of a guide course according to a modification example.

Furthermore, in the forgoing, an example is given in which only the single proposed course Cc is displayed on the screen of the display unit 7. In one alternative, as illustrated in FIG. 17, a plurality of the proposed courses Cc may be displayed on the same screen, allowing the user to select the guidance course Cg from among the proposed courses Cc. At this occasion, on the screen, the plurality of the proposed courses Cc may be displayed that are created with respectively different values of the discovery gain, e.g., "3", "2", "1", and "0", as target values. Moreover, gain display regions A1 may be provided for respective ones of the proposed courses Cc. An indicator of the corresponding discovery gain, i.e., the discovery gain as the target values in the course creation, may be displayed for each of the gain display regions A1. At this occasion, the indicator of the discovery gain is not limited to the display of the GUI that allows for the operation of the designation, e.g., the slide bar B2. It suffices to display at least information that allows the user to recognize the value of the discovery gain. Non-limiting example of such information may include numerical information indicating the value of the discovery gain, and information obtained by plotting the numerical value of the discovery gain. In this case, the operation of selecting the guidance course Cg may be, for example, an operation on the decide button B1 displayed for each of the proposed courses Cc.

As described above, displaying the indicator of the discovery gain corresponding to each of the proposed courses Cc as described above makes it possible for the user to easily grasp the features of each of the proposed courses Cc from the viewpoint of the discovery gain. This makes it easier to select the guidance course Cg.

3. Modification Examples of Embodiments

In the forgoing description, the evaluation criterion of the routes and the courses is exemplified by the evaluation criterion including factors such as a mountain path, a winding road, a gravel road, and a bumpy road, without limitation. Refer to FIGS. 6A and 6B. These factors such as a mountain path, a winding road, a gravel road, and a bumpy road, without limitation, are also referred to as a road that is able to give the user great experience, e.g., the joy and the pleasure of travel. Such great experience is derived from traveling by a vehicle having specific characteristics, i.e., a vehicle having excellent kinetic performance. Accordingly, the forgoing evaluation criterion including the factors such as a mountain path, a winding road, a gravel road, and a bumpy road, without limitation, may serve as an embodiment of an evaluation criterion determined in accordance with a characteristic of a vehicle.

However, the evaluation criterion in accordance with the characteristic of the vehicle is not limited to the use of the fixed evaluation criterion corresponding to the vehicle having the specific characteristics as described above.

For example, the information processor 1 is configured to accept setting of information regarding a body type of the vehicle and information regarding an individual vehicle model. Thus, the information processor 1 is configured to calculate evaluation points of the routes and the courses under different evaluation criteria in accordance with the information regarding, for example, the vehicle model thus set. For example, a sports sedan is able to enjoy a mountain path or a winding road, while a minivan is able to enjoy a flatter and more scenic road rather than a mountain path, etc. Accordingly, for the former vehicle model, an evaluation criterion may be used under which the greater number of evaluation points is obtained as a ratio of a mountain path and a winding road is higher. For the latter vehicle model, an evaluation criterion may be used under which the greater number of evaluation points is obtained as a ratio of a flat road and a road of a certain width or more is higher.

In the forgoing description, an example is given where the course creation unit 25 and the course evaluation unit 26 are provided in the information processor 1 including the display unit 7, i.e., a display device, the display controller 30, and the guidance course setting unit 31. The course creation unit 25 performs the course creation. The course evaluation unit 26 may calculate the course evaluation points. However, the course creation unit 25 and the course evaluation unit 26 may be provided in a separate device from a device including the display unit 7, the display controller 30, and the guidance course setting unit 31. In this case, a possible configuration may be as follows. For example, the server 42 may include the course creation unit 25 and the course evaluation unit 26. The server 42 may transmit, to the information processor 1, information regarding the course created and information regarding the course evaluation points Vc calculated for the relevant course. On the basis of the information thus transmitted, the information processor 1 may allow the display controller 30 to provide display of the course and the indicator of the course evaluation points Vc on the screen of the display unit 7. Furthermore, the guidance course setting unit 31 may set the course displayed on the screen as the course for the route guidance, on the basis of the user's operation.

With such a configuration, it is unnecessary to impose a processing load relating to the course creation and the calculation of the course evaluation points Vc on the information processor 1 as a user terminal such as a smartphone. This makes it possible to use a wider range of user terminals as the information processor 1.

4. Programs

In the forgoing, description is given of the information processor 1 according to the embodiments of the technology. Programs according to embodiments of the technology are programs that cause a computer device (an information processor) such as a CPU to execute processing as the information processor 1.

First and second programs according to the embodiments of the technology are programs that cause the information processor to execute the processing as illustrated in, for example, FIGS. 4 and 5.

The first program according to the embodiment of the technology causes the information processor to execute processing including: calculating route evaluation points for each of proposed routes in each of segments, on the basis of a condition of a road in the relevant one of the proposed routes, the segments being coupled between respective two nearest neighbors of a sequence from a starting point to a destination point through one or more via-points; selecting, on the basis of the route evaluation points, one proposed route from the proposed routes for each of the segments; and connecting the proposed routes selected by the selecting, to create a course from the starting point to the destination point.

The second program according to the embodiment of the technology causes the information processor to execute processing including: setting a starting point, one or more via-points, and a destination point; creating a course serially coupled between the starting point, the one or more via-points, and the destination point set by the setting; calculating course evaluation points based on a predetermined evaluation criterion, with respect to the course created in the creating; and setting the course as a proposed course for route guidance, on the basis of the course evaluation points.

A third program according to an embodiment of the technology is a program that causes the information processor to execute the processing as illustrated in, for example, FIGS. 13 and 14.

The third program according to the embodiment of the technology causes the information processor to execute processing including: setting a starting point, one or more via-points, and a destination point; creating a course serially coupled between the starting point, the one or more via-points, and the destination point set by the setting; calculating course evaluation points based on a predetermined evaluation criterion, with respect to the course created in the creating; and setting the course as a proposed course for route guidance, on the basis of the course evaluation points.

With such programs, it is possible to implement the above-described information processor 1 in, for example, a portable terminal device such as a smartphone and a tablet apparatus, a personal computer, or any other apparatus that is able to execute information processing.

The program that implements such an information processor 1 may be held in advance in, for example, an HDD as a recording medium incorporated in an apparatus such as a computer device, or a ROM in a microcomputer including a CPU. Alternatively, the program may be temporarily or permanently held, or recorded, in a removable recording medium such as a disk recording medium, a card type recording medium, or a stick type recording medium. In another alternative, the program may be installed in the information processor 1 from a removable recording medium, or may be downloaded through the network 41.

5. Conclusion of Embodiments

As described, a first information processor according to an embodiment of the technology (the information processor 1) includes a route evaluation unit (the route evaluation unit 23), a route selection unit (the route selection unit 24), and a course creation unit (the course creation unit 25). The route evaluation unit is configured to calculate route evaluation points for each of proposed routes in each of segments, on the basis of a condition of a road in the relevant one of the proposed routes. The segments are coupled between respective two nearest neighbors of a sequence from a starting point to a destination point through one or more via-points. The route selection unit is configured to select, on the basis of the route evaluation points, one proposed route from the proposed routes for each of the segments. The course creation unit is configured to connect the proposed routes selected by the route selection unit, to create a course from the starting point to the destination point.

This renders it unnecessary to evaluate all combinations of the proposed routes assumed in the respective segments from the starting point to the destination point, in creating the course that satisfies a predetermined evaluation criterion based on the condition of the road.

Hence, it is possible to effectively create an appropriate course that matches the condition of the road, as the course from the starting point to the destination point through the one or more via-points.

In the forgoing first information processor, the route selection unit may select one proposed route from the proposed routes for each of the segments, on the basis of the number of the route evaluation points. For example, the route selection unit may select, from the proposed routes for each of the segments, whichever proposed route has the greatest number of the route evaluation points.

This makes it possible to create the course that satisfies, at the maximum, the evaluation criterion based on the condition of the road.

Hence, it is possible to create a course of quality as high as possible in view of a degree of matching the evaluation criterion based on the condition of the road.

In the forgoing first information processor, the condition of the road may include a position of the road, a feature of the road, the weather on the road, or public reputation of the road, or any combination thereof.

For example, the condition of the road including the position of the road or the feature of the road, or both, makes it possible to allow the evaluation criterion to include factors such as whether or not the road on the course includes, for example: a mountain path or a winding road; a bumpy road; a gravel road; a tunnel; or a road in a forest. In other words, it is possible to allow the evaluation criterion to include factors such as presence or absence of, for example: a road that allows for the fully appreciation of the joy and the pleasure of travel; a road that allows for the fully appreciation of the kinematic performance of the vehicle, e.g., the power performance and the suspension performance; and/or a road that evokes the sense of adventure.

In a case with the evaluation criterion including the weather on the road, it is possible to incorporate, in the evaluation criterion, a factor such as the pleasure of travel.

In a case with the evaluation criterion including the public reputation of the road, it is possible to incorporate, in the evaluation criterion, a factor such as whether or not the road is well-reputed among, for example, remarks on the Internet.

Hence, it is possible to create a user-experience-oriented course in view of the fully appreciation of the joy and the pleasure of travel, the fully appreciation of the kinematic performance of the vehicle, and/or the evocation of the sense of adventure.

In the forgoing first information processor, necessary time for each of the proposed routes in a corresponding one of the segments may be shorter than predetermined time.

This makes it possible to prevent creation of an unpractical course having excessively long necessary time.

Hence, it is possible to perform well-balanced course creation of satisfying the condition of the road versus being practical.

In the forgoing first information processor, the course creation unit is configured to create a different course from a distance-oriented or necessary-time-oriented course. This makes it possible to prevent creation of the same course as an efficiency-oriented course such as the distance-oriented or necessary-time-oriented course.

Hence, it is possible to create not the efficiency-oriented course but an appropriate, user-experience-oriented course.

The forgoing first information processor may further include an acquisition unit (the acquisition unit 21) and a via-point setting unit (the via-point setting unit 22*a*). The acquisition unit is configured to acquire proposed via-points for the one or more via-points. The via-point setting unit is configured to set at least one of the proposed via-points acquired by the acquisition unit, as the one or more via-points to be used in creating the course.

This makes it possible to set at least one selected from the proposed via-points, as the one or more via-points.

Hence, it is possible to enhance flexibility of the course creation.

The forgoing first information processor may further include a determination unit (the determination unit 27) and a course setting unit (the course setting unit 28). The determination unit 27 is configured to make a determination as to whether or not the course created by the course creation unit satisfies a predetermined condition other than a condition based on the route evaluation points. The course setting unit is configured to set the course created by the course creation unit as a proposed course for route guidance, on the condition that the determination unit determines that the course created by the course creation unit satisfies the predetermined condition.

This allows the condition for the setting of the proposed course for the route guidance to include the condition other than the condition based on the route evaluation points, e.g., the presence of indispensable facilities such as a rest room on the course.

Hence, it is possible to set, as the proposed course for the route guidance, the course that satisfies the necessary condition other than the condition based on the route evaluation points.

In the forgoing first information processor, the determination unit may determine whether or not the course created by the course creation unit includes a requisite place to be included in the course, as the determination as to whether or not the course created by the course creation unit satisfies the predetermined condition.

This allows the condition for the setting of the proposed course for the route guidance to include the condition that the course includes the requisite place to be included in the course, e.g., facilities such as a rest room.

Hence, it is possible to set, as the proposed course for the route guidance, the course that satisfies the condition that the course includes the requisite place. This leads to the well-balanced course creation of satisfying the condition of the road versus being practical.

A first information processing method according to an embodiment of the technology includes: calculating route evaluation points for each of proposed routes in each of segments, on the basis of a condition of a road in the relevant one of the proposed routes, the segments being coupled between respective two nearest neighbors of a sequence from a starting point to a destination point through one or more via-points; selecting, on the basis of the route evaluation points, one proposed route from the proposed routes for each of the segments; and connecting the proposed routes selected by the selecting, to create a course from the starting point to the destination point.

With such a first information processing method as well, it is possible to produce similar workings and effects to those of the forgoing first information processor.

A second information processor according to an embodiment of the technology (the information processor 1) includes a setting unit (the setting unit 22), a course creation unit (the course creation unit 25), a course evaluation unit (the course evaluation unit 26), and a course setting unit (the course setting unit 28). The setting unit is configured to set a starting point, one or more via-points, and a destination point. The course creation unit is configured to create a course serially coupled between the starting point, the one or more via-points, and the destination point set by the setting unit. The course evaluation unit is configured to calculate course evaluation points based on a predetermined evaluation criterion, with respect to the course created by the course creation unit. The course setting unit is configured to set the course as a proposed course for route guidance, on the basis of the course evaluation points.

This allows the proposed course for the route guidance to be set on the basis of the course evaluation points calculated under the predetermined evaluation criterion with respect to the course created.

Hence, it is possible to set, as the proposed course for the route guidance, the appropriate course from the starting point to the destination point through the one or more via-points, in conformity with the predetermined evaluation criterion such as the joy of travel and the fine scenery.

In the forgoing second information processor, the course setting unit may revise the course regarding which a determination is made that the number of the course evaluation points is smaller than a predetermined reference value.

This makes it possible to prevent the course that fails to satisfy a predetermined criterion in terms of the course evaluation points, from being set as the proposed course for the route guidance.

Hence, it is possible to allow the appropriate course to be set as the proposed course for the route guidance.

The forgoing second information processor may further include a determination unit (the determination unit 27). The determination unit may determine whether or not the course created by the course creation unit includes a predetermined requisite point or facilities to be included in the course. On the condition that the determination unit determines that the course includes the requisite point or facilities, the course setting unit may set the course as the proposed course.

This allows the condition for the setting of the proposed course for the route guidance to include the condition that the course includes the requisite point or facilities to be included in the course, e.g., facilities such as a rest room.

Hence, it is possible to set, as the proposed course for the route guidance, the course that satisfies the condition that the course includes the requisite point or facilities, leading to the well-balanced course creation of satisfying the predetermined evaluation criterion such as the joy of travel and the fine scenery versus being practical.

In the forgoing second information processor, as to some of the requisite point or facilities, the determination unit may determine whether or not the course includes the relevant requisite point or facilities, on the condition that the necessary time for the course is equal to or longer than predetermined time. The necessary time for the course may be necessary time for travel from the starting point to the destination point.

Some of the requisite point or facilities may sometimes include a point or facilities, e.g., a rest room, the setting of which is unnecessary insofar as the necessary time ranges within a certain period of time. With the forgoing configuration, it is possible to prevent the condition of the setting of the course from including the condition that the course includes such requisite point or facilities, regardless of the short necessary time for the course.

Hence, it is possible to provide appropriate course setting.

The forgoing second information processor may further include a route evaluation unit (the route evaluation unit 23), and a route selection unit (the route selection unit 24). The route evaluation unit is configured to calculate route evaluation points for each of proposed routes in each of segments, on the basis of a condition of a road in the relevant one of the proposed routes. The segments are coupled between respective two nearest neighbors of a sequence from the starting point to the destination point through the one or more via-points. The route selection unit is configured to select, on the basis of the route evaluation points, one proposed route from the proposed routes for each of the segments. The course creation unit is configured to connect the proposed routes selected by the route selection unit, to create the course.

This renders it unnecessary to evaluate all the combinations of the proposed routes assumed in the respective segments from the starting point to the destination point, in creating the course that satisfies the predetermined evaluation criterion based on the condition of the road in view of, for example, the joy of travel and fine scenery.

Hence, it is possible to effectively create an appropriate course that matches the condition of the road, as the course from the starting point to the destination point through the one or more via-points.

In the forgoing second information processor, the condition of the road may include a position of the road, a feature of the road, the weather on the road, or public reputation of the road, or any combination thereof.

For example, the condition of the road including the position of the road or the feature of the road, or both, makes it possible to allow the evaluation criterion to include factors such as whether or not the road on the course includes, for example: a mountain path or a winding road; a bumpy road; a gravel road; a tunnel; or a road in a forest. In other words, it is possible to allow the evaluation criterion to include factors such as presence or absence of, for example: a road that allows for the fully appreciation of the joy and the pleasure of travel; a road that allows for the fully appreciation of the kinematic performance of the vehicle, e.g., the power performance and the suspension performance; and/or a road that evokes the sense of adventure.

In a case with the evaluation criterion including the weather on the road, it is possible to incorporate, in the evaluation criterion, a factor such as the pleasure of travel.

In a case with the evaluation criterion including the public reputation of the road, it is possible to incorporate, in the evaluation criterion, a factor such as whether or not the road is well-reputed among, for example, remarks on the Internet.

Hence, it is possible to create the user-experience-oriented course in view of the fully appreciation of the joy and the pleasure of travel, the fully appreciation of the kinematic performance of the vehicle, and/or the evocation of the sense of adventure.

A second information processing method according to an embodiment of the technology includes: setting a starting point, one or more via-points, and a destination point; creating a course serially coupled between the starting point, the one or more via-points, and the destination point set by the setting; calculating course evaluation points based on a predetermined evaluation criterion, with respect to the course created in the creating; and setting the course as a proposed course for route guidance, on the basis of the course evaluation points.

With such a second information processing method as well, it is possible to produce similar workings and effects to those of the forgoing second information processor.

A third information processor according to an embodiment of the technology (the information processor 1) includes a course evaluation unit (the course evaluation unit 26), a display controller (the display controller 30), and a guidance course setting unit (the guidance course setting unit 31). The course evaluation unit is configured to calculate course evaluation points based on a predetermined evaluation criterion, with respect to a course serially coupled and created between a starting point, one or more via-points, and a destination point. The display controller is configured to provide display of the course and an indicator of the course evaluation points on a same screen. The guidance course setting unit is configured to set the course displayed on the screen as a course for route guidance on the basis of an operation by a user.

As described above, displaying the course and the indicator of the course evaluation points on the same screen makes it possible for the user to check the course evaluation points and to make an operation of designating the course for the route guidance.

Hence, it is possible to allow the user to appropriately designate the course having the desired course evaluation points as the course for the route guidance, with respect to the course from the starting point to the destination point through the one or more via-points.

In the forgoing third information processor, in response to the user's operation of designating the course evaluation points, the display controller provides display of the course corresponding to the course evaluation points designated by the operation of the designation.

This makes it unnecessary for the user themselves to perform course edition such as the selection of the via-point and a setting instruction, in a case where the user is interested in checking the course having the desired evaluation points on the screen. It suffices for the user to make an operation of designating the desired evaluation points.

Hence, it is possible to reduce a burden of the operation on the user.

In the forgoing third information processor, the display controller may provide display of a graphical user interface that allows the user to make an operation to designate the course evaluation points, as the indicator of the course evaluation points.

This makes it possible for the user to designate the desired evaluation points with an intuitive and easy operation.

Hence, it is possible to enhance operation-related user-friendliness.

The forgoing third information processor may further include a course creation unit (the course creation unit 25). The course creation unit may create a course corresponding to post-change course evaluation points, in response to an operation of changing the course evaluation points displayed on the screen. On the condition that the operation is made to change the course evaluation points, the display controller may perform a display control to switch a course to be displayed on the screen from the course corresponding to the pre-change course evaluation points to the course corresponding to the post-change course evaluation points.

This causes the course to be displayed on the screen to be switched to the course corresponding to the post-change evaluation points, in association with the operation of changing the course evaluation points displayed on the screen.

Hence, it is possible to give the user an intuitive grasp of a change in contents of the course in accordance with the change in the course evaluation points.

In the forgoing third information processor, the course evaluation unit may calculate, as the course evaluation points, evaluation points based on an evaluation criterion determined in accordance with a characteristic of a vehicle the user is aboard during the route guidance.

The evaluation criterion determined in accordance with the characteristic of the vehicle is exemplified by an evaluation criterion including factors such as a mountain path, a winding road, a gravel road, and a bumpy road, without limitation. These factors such as a mountain path, a winding road, a gravel road, and a bumpy road, without limitation, are also referred to as a road that is able to give the user great experience, e.g., the joy and the pleasure of travel. Such great experience is derived from traveling by a vehicle having specific characteristics, i.e., a vehicle having excellent kinetic performance such as power performance and suspension performance. Accordingly, the forgoing evaluation criterion including the factors such as a mountain path, a winding road, a gravel road, and a bumpy road, without limitation, may serve as an embodiment of the evaluation criterion determined in accordance with the characteristic of the vehicle.

Calculating the evaluation points based on the evaluation criterion determined in accordance with the characteristic of the vehicle makes it possible to set the user-experience-oriented course in view of the fully appreciation of the joy and the pleasure of travel, the fully appreciation of the kinematic performance of the vehicle, and/or the evocation of the sense of adventure.

A third information processing method according to an embodiment of the technology includes: calculating course evaluation points based on a predetermined evaluation criterion, with respect to a course serially coupled and created between a starting point, one or more via-points, and a destination point; providing display of the course and an indicator of the course evaluation points on a same screen; and setting the course displayed on the screen as a course for route guidance on the basis of an operation by a user.

With such a third information processing method as well, it is possible to produce similar workings and effects to those of the forgoing third information processor.

An information processing system according to an embodiment of the technology includes a server device (the server 42) and a display device (the information processor 1). The server device includes a course evaluation unit (the course evaluation unit 26) and a transmission unit. The course evaluation unit is configured to calculate course evaluation points based on a predetermined evaluation criterion, with respect to a course serially coupled and created between a starting point, one or more via-points, and a destination point. The transmission unit is configured to transmit, to the display device, information regarding the course and information regarding the course evaluation points. The display device includes a display controller (the display controller 30) and a guidance course setting unit (the guidance course setting unit 28). The display controller is configured to provide display of the course and an indicator of the course evaluation points on a screen, on the basis of the information transmitted by the transmission unit. The guidance course setting unit is configured to set the course displayed on the screen as a course for route guidance on the basis of an operation by a user.

With such an information processing system as well, it is possible to produce similar workings and effects as those of the forgoing third information processor.

The CPU 2 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the CPU 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the CPU 2 illustrated in FIG. 1.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An information processor comprising:
a CPU configured to:
receive, from a user, a starting point and a destination point;
in response to receiving the starting point and the destination point, retrieve a first combination of via-points from one or more databases, and determine a course from the received starting point through the first combination of the via-points in a first sequential order and one or more roads to the received destination point to be traveled by a vehicle based on information on the one or more roads stored in the one or more databases;
search an efficiency-oriented course connecting between the starting point and the destination through at least roads by using predetermined algorithm;
repeat, in a case where the determined course matches the efficiency-oriented course, i) changing the first sequential order into a second sequential order of the first combination of the via-points, changing the first combination of the via-points into a second combination of via-points retrieved from the one or more databases, or both and ii) updating the determined course from the starting point to the destination point based on the changing; and
cause, in a case where the determined course is different from the efficiency-oriented course, a display screen to display at least a map, a first line representing the determined course and being displayed to be superimposed on the map, marks different from the map and the line and representing a corresponding combination to the determined course out of the first combination of the via-points and the second combination of the via-points, information including at least one of distance information and necessary time information, and a first user interface configured to receive an input of an instruction to set the determined course as a course for providing route guidance,
wherein the distance information includes a first numerical value representing a difference value between a distance of the determined course and a distance of the efficiency-oriented course, and the necessary time information includes a second numerical value representing a difference value between necessary time for the determined course and necessary time for the efficiency-oriented course.

2. The information processor according to claim 1, wherein the CPU is configured to:
  set first route candidates and second route candidates, the first route candidates being different from each other and being routes connecting between the starting point and a first via-point nearest from the starting point of the first combination of the via-points, the second route candidates being different from each other and being routes connecting between the destination point and a second via-point nearest from the destination point of the first combination of the via-points;
  evaluate the first route candidates and the second route candidates based on information related to a condition of a road to respectively assign first evaluation points to the first route candidates and second evaluation points to the second route candidates; and
  select 1) the first route from the first route candidates based on a highest route evaluation point of the first route evaluation points and 2) the second route from the second route candidates based on a highest route evaluation point of the second route evaluation points.

3. The information processor according to claim 2, wherein the condition of the road includes a position of the road, a feature of the road, weather on the road, or public reputation of the road, or any combination thereof.

4. The information processor according to claim 2, wherein a necessary time for the first route is shorter than a predetermined time.

5. The information processor according to claim 1, wherein the one or more databases are stored in at least one of a memory and a server communicable with the CPU.

6. The information processor according to claim 2, wherein the CPU is configured to:
  determine whether or not the determined course satisfies a predetermined condition other than a condition based on the first route evaluation points and the second route evaluation points; and
  provide the route guidance when the determined course is different from the efficiency-oriented course and the destination point and satisfies the predetermined condition.

7. The information processor according to claim 6, wherein the CPU is configured to determine that the determined course includes a requisite place to be included in the course, as the determination that the determined course satisfies the predetermined condition.

8. An information processing method for determining a course between a starting point and a destination point to be traveled by a vehicle, the information processing method comprising:
  receiving, from a user, a starting point and a destination point;
  in response to receiving the starting point and the destination point, retrieving a first combination of via-points from one or more databases, and determining a course from the received starting point through the first combination of the via-points in a first sequential order and one or more roads to the received destination point to be traveled by a vehicle based on information on the one or more roads stored in the one or more databases;
  searching an efficiency-oriented course connecting between the starting point and the destination point through at least roads by using a predetermined algorithm;
  repeating, in a case where the determined course matches the efficiency-oriented course, i) changing the first sequential order into a second sequential order of the first combination of the via-points, changing the first combination of the via-points into a second combination of the via points acquired from the one or more databases, or both, and ii) updating the determined course from the starting point to the destination point based on the changing; and
  causing, in a case where the determined course is different from the efficiency-oriented course, a display screen to display at least a map, a first line representing the determined course and being displayed to be superimposed on the map, marks different from the map and the line and representing a corresponding combination to the determined course out of the first combination of the via-points and the second combination of the via-points, information including at least one of distance information and necessary time information, and a first user interface configured to receive an input of an instruction to set the determined course as a course for providing route guidance,
  wherein the distance information includes a first numerical value representing a difference value between a distance of the determined course and a distance of the efficiency-oriented course, and the necessary time information includes a second numerical value representing a difference value between necessary time for the determined course and necessary time for the efficiency-oriented course.

9. A non-transitory computer-readable recording medium containing a program, the program causing, when executed by a computer, the computer to implement a method for determining a course between a starting point and a destination point to be traveled by a vehicle, the method comprising:
  receiving, from a user, a starting point and a destination point;
  in response to receiving the starting point and the destination point, retrieving a first combination of via-points from one or more databases, and determining a course from the received starting point through the first combination of the via-points in a first sequential order and one or more roads to the received destination point to be traveled by a vehicle based on information on the one or more roads stored in the one or more databases;
  searching an efficiency-oriented course connecting between the starting point and the destination point through at least roads by using a predetermined algorithm;
  repeating, in a case where the determined course matches the efficiency-oriented course, i) changing the first sequential order into a second sequential order of the first combination of the via-points, changing the first combination of the via-points into a second combination of the via points acquired from the one or more databases, or both, and ii) updating the determined course from the starting point to the destination point based on the changing; and
  causing, in a case where the determined course is different from the efficiency-oriented course, a display screen to display at least a map, a first line representing the determined course and being displayed to be superimposed on the map, marks different from the map and the line and representing a corresponding combination to the determined course out of the first combination of the via-points and the second combination of the via-points, information including at least one of distance information and necessary time information, and a first user interface configured to receive an input of an instruction to set the determined course as a course for providing route guidance, wherein the distance information includes a first numerical value representing a difference value between a distance of the determined course and a distance of the efficiency-oriented course, and the necessary time information includes a second numerical value representing a difference value between necessary time for the determined course and necessary time for the efficiency-oriented course.

10. The information processor according to claim 1, wherein the CPU is further configured to: extract, from the one or more databases, information of spots including facilities that are present on the determined course or are located at a distance from the determined course from a predetermined range based on positional information of the spots, the one or more databases being stored in one or more memories; and determine that the spots are predetermined requisite places to be included in the determined course.

11. The information processor according to claim 1, wherein the distance information further includes a third numerical value representing the distance of the determined course, and the necessary time information further includes a fourth numerical value representing the necessary time for the determined course, and the map, the line, the information including at least one of the distance information and the necessary time information, the marks and the user interface are configured to be simultaneously displayed on the display screen.

12. The information processing method according to claim 8, wherein the distance information further includes a third numerical value representing the distance of the determined course, and the necessary time information further includes a fourth numerical value representing the necessary time for the determined course, and the map, the line, the information including at least one of the distance information and the necessary time information, the marks and the user interface are configured to be simultaneously displayed on the display screen.

13. The non-transitory computer-readable recording medium according to claim 9, wherein the distance information further includes a third numerical value representing the distance of the determined course, and the necessary time information further includes a fourth numerical value representing the necessary time for the determined course, and the map, the line, the information including at least one of the distance information and the necessary time information, the marks and the user interface are configured to be simultaneously displayed on the display screen.

14. The information processor according to claim 1, wherein at least the map, the line, the information including at least one of the distance information and the necessary time information, and the user interface are configured to be simultaneously displayed in the display screen.

15. The information processing method according to claim 8, wherein at least the map, the line, the information including at least one of the distance information and the necessary time information, and the user interface are configured to be simultaneously displayed in the display screen.

16. The non-transitory computer-readable recording medium according to claim 9, wherein at least the map, the line, the information including at least one of the distance information and the necessary time information, and the user interface are configured to be simultaneously displayed in the display screen.

17. The information processor according to claim 1, wherein the CPU is configured to cause, in the case where the determined course is different from the efficiency-oriented course, the display screen to further display a second user interface configured to receive an input to change displaying the first line into displaying a second line representing the efficiency-oriented course and being displayed to be superimposed on the map.

18. The information processing method according to claim 8, wherein the causing the display screen to display at least the map, the first line, the information including at least the one of distance information and necessary time information, and the first user interface includes causing the display screen to further display a second user interface configured to receive an input to change displaying the first line into displaying a second line representing the efficiency-oriented course and being displayed to be superimposed on the map.

19. The non-transitory computer-readable recording medium according to claim 9, wherein the causing the display screen to display at least the map, the first line, the information including at least the one of distance information and necessary time information, and the first user interface includes causing the display screen to further display a second user interface configured to receive an input to change displaying the first line into displaying a second line representing the efficiency-oriented course and being displayed to be superimposed on the map.

\* \* \* \* \*